(12) United States Patent
Young et al.

(10) Patent No.: US 7,697,842 B2
(45) Date of Patent: Apr. 13, 2010

(54) AUTOMATED OPTICAL TRANSPORT SYSTEM

(76) Inventors: Marvin Ray Young, 4601 Deer Valley La., Richardson, TX (US) 75082-3873; Michael H. Eiselt, 250 Martin Pl., Middletown, NJ (US) 07448; Daniel Nooner, 3500 Barberry, Wylie, TX (US) 75098; Jeffrey Pearlman, 1382 5th Ave., #4, San Francisco, CA (US) 94122; Michael L. Cooper, 3202 Birkshire La., Richardson, TX (US) 75082

( * ) Notice: Subject to any disclaimer, the term of this patent is extended or adjusted under 35 U.S.C. 154(b) by 278 days.

(21) Appl. No.: 11/514,781

(22) Filed: Aug. 31, 2006

(65) Prior Publication Data

US 2006/0291859 A1   Dec. 28, 2006

Related U.S. Application Data

(62) Division of application No. 10/421,681, filed on Apr. 22, 2003.

(60) Provisional application No. 60/374,373, filed on Apr. 22, 2002, provisional application No. 60/377,123, filed on Apr. 30, 2002, provisional application No. 60/377,160, filed on Apr. 30, 2002, provisional application No. 60/377,162, filed on Apr. 30, 2002.

(51) Int. Cl.
*H04B 10/08* (2006.01)

(52) U.S. Cl. .............. 398/33; 398/58; 398/59; 398/79; 398/177; 398/181; 359/337; 359/341.2; 385/24; 385/37

(58) Field of Classification Search .......... 398/83, 398/25, 30, 33, 38, 177, 181, 147, 158, 31, 398/32, 58, 59, 173, 159, 160, 34, 79; 385/24, 385/37; 359/337, 341.02, 334
See application file for complete search history.

(56) References Cited

U.S. PATENT DOCUMENTS

| | | | |
|---|---|---|---|
| 4,229,831 A | 10/1980 | Lacher | 398/214 |
| 4,535,459 A | 8/1985 | Hogge, Jr. | 375/324 |
| 4,636,859 A | 1/1987 | Vernhet et al. | 348/468 |
| 4,710,022 A | 12/1987 | Soeda et al. | 356/73.1 |
| 5,224,183 A | 6/1993 | Dugan | 385/24 |
| 5,225,922 A | 7/1993 | Chraplyvy et al. | 398/94 |
| 5,267,071 A | 11/1993 | Little et al. | 398/162 |
| 5,299,048 A | 3/1994 | Suyama | 398/181 |
| 5,321,541 A | 6/1994 | Cohen | 398/82 |
| 5,455,703 A | 10/1995 | Duncan et al. | 398/136 |
| 5,559,625 A | 9/1996 | Smith et al. | 398/66 |

(Continued)

FOREIGN PATENT DOCUMENTS

JP   01115230   5/1989

(Continued)

*Primary Examiner*—Hanh Phan
(74) *Attorney, Agent, or Firm*—Woodcock Washburn LLP

(57) ABSTRACT

An automated optical transport system is provided which provides for automatic discovery of system components, automatic inventory of system components, automatic topology detection, automatic provisioning of channels, and automatic characterization and tuning of system components and fiber. The invention provides automation capability through inclusion of management card capabilities at each station which communicates through a reverse propagating service channel. Dynamic and propagation direction independent segments are provided in conjunction with a token-based scheme to repeatedly tune, update and monitor the transport system.

82 Claims, 21 Drawing Sheets

U.S. PATENT DOCUMENTS

| | | | |
|---|---|---|---|
| 5,613,210 A | 3/1997 | Van Driel et al. | 455/45 |
| 5,726,784 A | 3/1998 | Alexander et al. | 398/91 |
| 5,737,118 A | 4/1998 | Sugaya et al. | 359/341.43 |
| 5,778,116 A | 7/1998 | Tomich | 385/16 |
| 5,790,285 A | 8/1998 | Mock | 398/21 |
| 5,812,290 A | 9/1998 | Maeno et al. | 398/45 |
| 5,825,949 A | 10/1998 | Choy et al. | 385/24 |
| 5,877,881 A | 3/1999 | Miyauchi et al. | 398/193 |
| 5,903,613 A | 5/1999 | Ishida | 375/340 |
| 5,914,794 A | 6/1999 | Fee | 398/20 |
| 5,914,799 A | 6/1999 | Tan | 398/92 |
| 5,936,753 A | 8/1999 | Ishikawa | 398/72 |
| 5,940,209 A | 8/1999 | Nguyen | 359/341.1 |
| 5,963,350 A | 10/1999 | Hill | 398/70 |
| 5,995,694 A | 11/1999 | Akasaka et al. | 385/123 |
| 6,005,702 A | 12/1999 | Suzuki et al. | 398/185 |
| 6,021,245 A | 2/2000 | Berger et al. | 385/123 |
| 6,023,366 A | 2/2000 | Kinoshita | 359/337.12 |
| 6,038,062 A | 3/2000 | Kosaka | 359/337 |
| 6,075,634 A | 6/2000 | Casper et al. | 398/139 |
| 6,078,414 A | 6/2000 | Iwano | 398/182 |
| 6,081,360 A | 6/2000 | Ishikawa et al. | 398/147 |
| 6,084,694 A | 7/2000 | Milton et al. | 398/83 |
| 6,088,152 A | 7/2000 | Berger et al. | 359/334 |
| 6,108,074 A | 8/2000 | Bloom | 356/73.1 |
| 6,111,675 A | 8/2000 | Mao et al. | 398/7 |
| 6,122,095 A | 9/2000 | Fatehi | 359/337 |
| 6,151,334 A | 11/2000 | Kim et al. | 370/468 |
| 6,157,477 A | 12/2000 | Robinson | 398/147 |
| 6,160,614 A | 12/2000 | Unno | 356/73.1 |
| 6,163,392 A | 12/2000 | Condict et al. | 398/1 |
| 6,163,636 A | 12/2000 | Stentz et al. | 385/24 |
| 6,173,094 B1 | 1/2001 | Bowerman et al. | 385/24 |
| 6,177,985 B1 | 1/2001 | Bloom | 356/73.1 |
| 6,198,559 B1 | 3/2001 | Gehlot | 398/161 |
| 6,229,599 B1 | 5/2001 | Galtarossa | 356/73.1 |
| 6,236,481 B1 | 5/2001 | Laor | 398/9 |
| 6,236,499 B1 | 5/2001 | Berg et al. | 359/341.2 |
| 6,246,510 B1 | 6/2001 | BuAbbud et al. | 359/337 |
| 6,259,553 B1 | 7/2001 | Kinoshita | 359/337 |
| 6,259,554 B1 | 7/2001 | Shigematsu et al. | 359/337 |
| 6,259,693 B1 | 7/2001 | Ganmukhi et al. | 370/366 |
| 6,259,845 B1 | 7/2001 | Sardesai | 385/123 |
| 6,272,185 B1 | 8/2001 | Brown | 375/340 |
| 6,275,315 B1 | 8/2001 | Park et al. | 398/148 |
| 6,288,811 B1 | 9/2001 | Jiang et al. | 398/79 |
| 6,288,813 B1 | 9/2001 | Kirkpatrick et al. | 398/136 |
| 6,292,289 B1 | 9/2001 | Sugaya et al. | 359/337 |
| 6,307,656 B2 | 10/2001 | Terahara | 398/139 |
| 6,317,231 B1 | 11/2001 | Al-Salameh et al. | 394/34 |
| 6,317,255 B1 | 11/2001 | Fatehi et al. | 359/341.44 |
| 6,323,950 B1 | 11/2001 | Kim et al. | 356/477 |
| 6,327,060 B1 | 12/2001 | Otani et al. | 398/83 |
| 6,356,384 B1 | 3/2002 | Islam | 359/334 |
| 6,359,729 B1 | 3/2002 | Amoruso | 359/341.1 |
| 6,388,801 B1 | 5/2002 | Sugaya et al. | 359/334 |
| 6,396,853 B1 | 5/2002 | Humphrey et al. | 370/535 |
| 6,480,326 B2 | 11/2002 | Papernyi et al. | 359/334 |
| 6,515,779 B2 | 2/2003 | Fee | 398/147 |
| 6,519,082 B2 | 2/2003 | Ghera et al. | 359/341.4 |
| 6,574,037 B2 | 6/2003 | Islam et al. | 359/334 |
| 6,621,621 B1 * | 9/2003 | Jones et al. | 359/337.11 |
| 6,724,526 B1 | 4/2004 | Onaka et al. | 359/337.1 |
| 6,744,958 B2 | 6/2004 | Inagaki et al. | 385/123 |
| 6,744,988 B2 | 6/2004 | Leclerc et al. | 398/102 |
| 6,807,232 B2 | 10/2004 | Nicholson et al. | 375/240.26 |
| 6,826,201 B2 | 11/2004 | Hind | 370/535 |
| 6,920,288 B2 * | 7/2005 | Adleman et al. | 398/83 |
| 6,922,532 B2 | 7/2005 | Simard et al. | |
| 6,944,163 B2 | 9/2005 | Bottorff et al. | 370/395.5 |
| 6,950,448 B2 | 9/2005 | Tornetta et al. | 370/537 |
| 7,013,084 B2 | 3/2006 | Baotou et al. | |
| 7,046,695 B2 | 5/2006 | Silvers | 370/493 |
| 7,123,833 B2 | 10/2006 | Szczepanek et al. | 398/33 |
| 7,139,277 B2 | 11/2006 | Ofek et al. | 370/401 |
| 7,170,906 B2 | 1/2007 | Ofek et al. | 370/498 |
| 7,190,902 B2 * | 3/2007 | Solheim et al. | 398/69 |
| 7,233,742 B2 | 6/2007 | Hoshida et al. | 398/79 |
| 2002/0012152 A1 | 1/2002 | Agazzi et al. | 398/202 |
| 2002/0044317 A1 | 4/2002 | Gentner et al. | 359/337.13 |
| 2002/0191241 A1 * | 12/2002 | Emery et al. | 359/109 |
| 2004/0208534 A1 | 10/2004 | Boertjes et al. | |

FOREIGN PATENT DOCUMENTS

| | | |
|---|---|---|
| JP | 02238736 | 9/1990 |

* cited by examiner

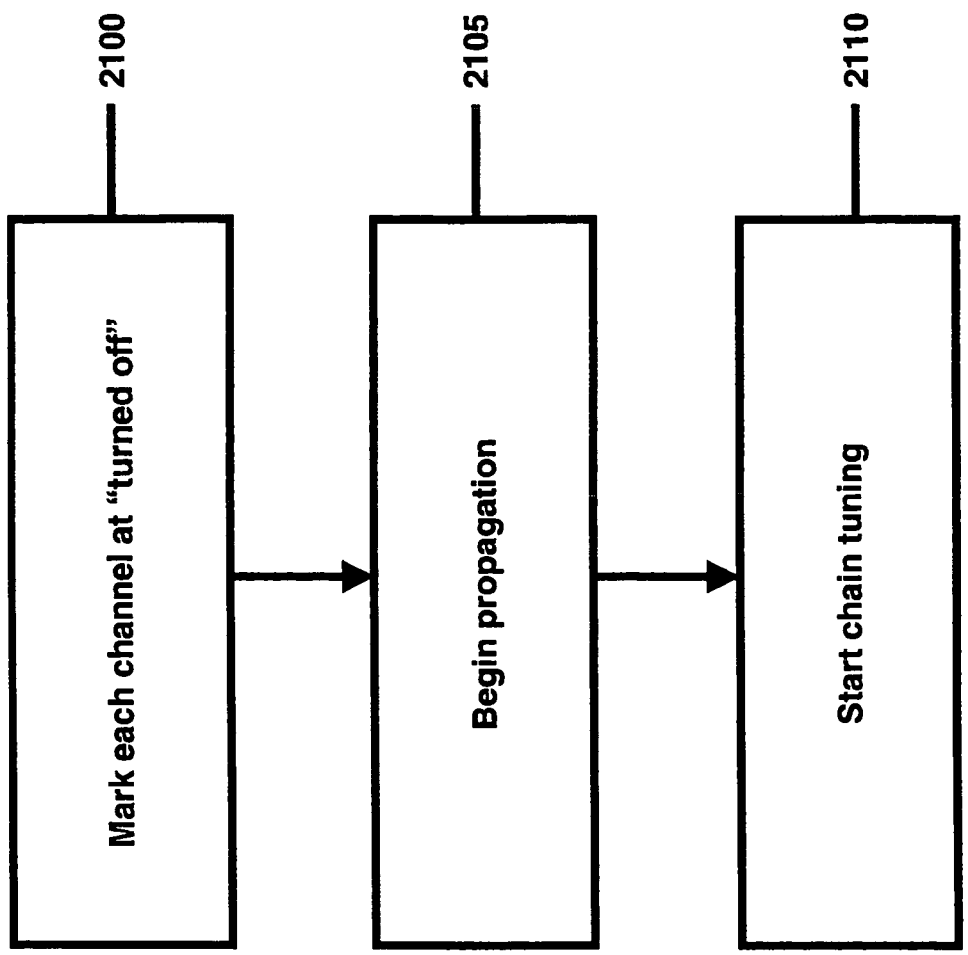

AUTOMATED OPTICAL TRANSPORT SYSTEM

CROSS-REFERENCE TO RELATED APPLICATIONS

This application is a divisional of U.S. Application Ser. No. 10/421,681, filed Apr. 22, 2003, which claims benefit of U.S. Provisional Application No. 60/374,373, filed Apr. 22, 2002, U.S. Provisional Application No. 60/377,123, filed Apr. 30, 2002, U.S. Provisional Application No. 60/377,160, filed Apr. 30, 2002, and U.S. Provisional Application No. 60/377,162, filed Apr. 30, 2002, each of which is hereby incorporated by reference in its entirety.

FIELD OF THE INVENTION

This invention relates to a computer architecture that provides for timely automated end-to-end wavelength provisioning and turn-up of an optical transport system and more particularly to the measuring and automatically correcting for the dispersion, attenuation, and other characteristics of optical fiber, and for mapping and adjusting optical amplifiers, optical spectrum analyzers, regenerators, and other components in the optical transport system.

BACKGROUND OF THE INVENTION

A goal of many modern long haul optical transport systems is to provide for the efficient transmission of large volumes of voice and data traffic over trans-continental distances at low costs. Various methods of achieving these goals include time division multiplexing (TDM) and wavelength division multiplexing (WDM). In time division multiplexed systems, data streams comprised of short pulses of light are interleaved in the time domain to achieve high spectral efficiency, high data rate transport. In wavelength division multiplexed systems, data streams comprised of short pulses of light of different carrier frequencies, or equivalently wavelength, are co-propagated in the same fiber to achieve high spectral efficiency, high data rate transport.

The transmission medium of these systems is typically optical fiber. In addition there is a transmitter and a receiver. The transmitter typically includes a semiconductor diode laser, and supporting electronics. The laser may be directly modulated with a data train with an advantage of low cost, and a disadvantage of low reach and capacity performance. After binary modulation, a high bit may be transmitted as an optical signal level with more power than the optical signal level in a low bit. Often, the optical signal level in a low bit is engineered to be equal to, or approximately equal to zero. In addition to binary modulation, the data can be transmitted with multiple levels, although in current optical transport systems, a two level binary modulation scheme is predominantly employed.

Typical long haul optical transport dense wavelength division multiplexed (DWDM) systems transmit 40 to 80 10 Gbps (gigabit per second) channels across distances of 3000 to 6000 km in a single 30 nm spectral band. A duplex optical transport system is one in which traffic is both transmitted and received between parties at opposite ends of the link. In current DWDM long haul transport systems transmitters different channels operating at distinct carrier frequencies are multiplexed using a multiplexer. Such multiplexers may be implemented using array waveguide (AWG) technology or thin film technology, or a variety of other technologies. After multiplexing, the optical signals are coupled into the transport fiber for transmission to the receiving end of the link.

At the receiving end of the link, the optical channels are de-multiplexed using a de-multiplexer. Such de-multiplexers may be implemented using array waveguide (AWG) technology or thin film technology, or a variety of other technologies. Each channel is then optically coupled to separate optical receivers. The optical receiver is typically comprised of a semiconductor photodetector and accompanying electronics.

The total link distance may in today's optical transport systems be two different cities separated by continental distances, from 1000 km to 6000 km, for example. To successfully bridge these distances with sufficient optical signal power relative to noise, the total fiber distance is separated into fiber spans, and the optical signal is periodically amplified using an in-line optical amplifier after each fiber span. Typical fiber span distances between optical amplifiers are 50-100 km. Thus, for example, 30 100 km spans would be used to transmit optical signals between points 3000 km apart. Examples of in-line optical amplifiers include erbium doped fiber amplifiers (EDFAs) and semiconductor optical amplifiers (SOAs).

A duplex optical transport system is one in which voice and data traffic is both transmitted and received between parties at opposite end of the link. There are several architectures that support duplex operation in fiber optical transport systems. Each suffers from some limitation.

Long-distance transmission of data at high speed is increasingly dependent on optical fibers and efficient state-of-the-art light wave transmission systems. These transmission systems typically include, the optical fiber itself and among other things, end terminals, programmable optical amplifiers, optical spectrum analyzers, regenerators, and to be generically referred to as components in the transmission system. Besides transmitting customer data at high data rates, fiberoptic transmission systems that span large geographic distances must be able to send maintenance information or telemetry from one part of the system to another. In traditional regenerated systems, maintenance information is added as overhead to customer data which is transmitted on the fiber. Access to the overhead data is allowed at each regenerator site. The data can be provided to a local user or passed through the data collection station unchanged. In systems employing optical amplifiers, maintenance information is transmitted on a separate wavelength on the same optical fiber. Access to customer data is usually not possible because it is transmitted on a different wavelength.

Service providers who assemble and maintain light wave transmission systems, and network providers who manage networks of such optical transport systems are under increasing pressure to reduce costs. Equipment costs, maintenance costs and the cost of personnel to operate the transmission system all must be kept at a minimum in order for service providers to remain as competitive as possible. In current optical transport systems it is necessary to manually find and track the very large number of components, subsystems and modules that comprise the optical transport system. In order to manage, maintain and grow the optical transport system it is necessary to have an up-to-date, correct inventory of the various components, subsystems and modules that comprise the optical transport system. This inventory comprises a complete and correct listing of the type and quantity of the various components, subsystems and modules that comprise the optical transport systems. Human error combined with changing configurations currently lead to inefficient incorrect inventory process. Consequently there is a need for an optical transport system that automatically discovers the various components, subsystems and modules that comprise the optical transport systems. Such a capability is referred to as autodiscovery. Similarly, there is a need for an optical transport system that automatically inventories the various components, subsystems and modules that comprise the optical transport systems. Such a capability is referred to as autoinventory. In order to manage, maintain and grow the optical transport system it is additionally necessary to have an up-to-date, correct topology of the various components, subsystems and modules that comprise the optical transport system. This comprises a complete and correct arrangement of the connections and relative locations of the various components, subsystems and modules that comprise the optical transport systems. Human error combined with changing configurations currently lead to inefficient incorrect topology process. Consequently there is a need for an optical transport system that automatically determines the topology of the various components, subsystems and modules that comprise the optical transport systems. Such a capability is referred to as autotopology.

Provisioning a new channel to provide duplex operation between terminals that may be located in different cities is currently a tedious, labor intensive process. Consequently there is a need for an optical transport system that automatically provisions a new channel to provide duplex operation between distant terminals. Such a capability is referred to as auto-provisioning.

Certain physical characteristics of each optical fiber and the components used in the transportation system impose limitations on the data rate and transmission distance of any light wave transmission system. The performance of the components used, depends on, among other factors, the settings of the components, for example the gain setting on an in line amplifier. The performance of the fiber is based mainly on attenuation and chromatic dispersion properties of the fiber. The physical characteristics of each optical fiber cannot be readily adjusted for optimal performance. However, the components used in the transport system can be adjusted for optimal performance.

Attenuation is a primary limitation in the design of a light wave system. Attenuation is the loss of optical energy which is caused by impurities in the fiber, scattering and other phenomena. Loss of optical energy negatively affects information transmission by reducing the amplitude of the transmitted signal. Attenuation can be corrected, within limits, by regeneration or the addition of optical amplifiers along the path of the optical fiber to amplify the signal to replace lost optical energy. Further, the relative attenuation of a channel operating at wavelength as compared to a channel operating at a second wavelength is also important in an optical transport system. Different channels may see different relative attenuations because of the different spectral filtering of the different components, subsystems and modules that comprise the optical transport system.

Another important limitation is chromatic dispersion. Chromatic dispersion, or more precisely, group velocity dispersion, is caused by a variation in the group velocity in a fiber with changes in optical frequency. Chromatic dispersion causes the spreading of pulses in a light wave signal. Pulse spreading leads to timing problems and increased error rates.

In order to maximize the data transmission distance and speed, it is necessary to measure or characterize attenuation and chromatic dispersion for each fiber. After characterization, it is also necessary to correct for these limitations as far as is possible to maximize data transmission speed and distance. In the prior art, characterization takes place manually requiring a labor-intensive process of measuring each parameter at the time of installation. Consequently, there is a need for an optical transport system that automatically characterizes the physical properties of the fiber plant and other components, subsystems and modules that comprise the optical transport system. Such a capability is referred to as autocharacterization. After characterization, the system operator must currently manually correct for attenuation and chromatic dispersion by setting certain parameters on each amplifier specification. Consequently, there is a need for an optical transport system that automatically corrects the physical properties of the fiber plant and other components, subsystems and modules that comprise the optical transport system. Such a capability is referred to as autotuning. Autotuning will automatically adjust the control parameters of the optical transport system to account for changes in the number and character of the channels that are operational at a given time.

Attenuation is corrected for in the prior art by adjusting the gain and tilt of each amplifier in the system. The gain of each amplifier causes a linear difference in amplification over the range of wavelengths amplified. The linear difference is known as tilt. Additionally, stimulated Raman scatterings can cause significant power tilt in the fiber which is further amplified. Skill and experience of the operator are required to account for and correctly adjust each component of the transmission system for maximum efficiency at each wavelength and to compensate for tilt as much as possible. However, this prior art procedure is prone to human error and inconsistency.

Chromatic dispersion is corrected for in the prior art by manually measuring the dispersion which has taken place in the signal at any of the amplifier locations. "Compensators" are then fabricated which compensate for the dispersion measured by the operator and installed to correct the dispersion. Fabrication of compensators is time consuming and can take up to several weeks to complete. The process is also so specific that minor changes in fiber characteristics due to repairs and fiber aging can require a repeat of the process. Also, because each fiber is typically measured only once, changes in the system are largely unaccounted for during system operation, reducing the efficiency of the system and the maximum data rate over time.

Certain prior art systems have attempted to address these problems with varying success.

U.S. Pat. No. 5,914,794 to Fee, et al., entitled "Method of And Apparatus For Detecting and Reporting Faults In An All-Optical Communications System", discloses a method and system for reporting and detecting faults in an optical communications systems. A system monitors each optical fiber and uses the optical supervisory channel to detect and report faults. However, Fee does not disclose or suggest a way to eliminate the time consuming necessity for manual adjustment of the transmission system.

U.S. Pat. No. 5,225,922 to Chraplyvy, et al., entitled "Optical Transmission System Equalizer", discloses an invention which selectively equalizes the optical gain or optical signal noise ratios of channels of a wavelength multiplexed optical transmission system. The optical output powers and the signal to noise ratios are selectively equalized by adjusting the optical input powers through a controller connected to an end terminal of the transmission system. However, the Chraplyvy system has drawbacks. It is difficult to apply on long-haul systems and does not account for dispersion characterization or measurement. Additionally, the Chraplyvy system does not provide for adjustment of amplifier ripple as opposed to amplifier gain.

U.S. Pat. No. 5,940,209 to Nguyen, entitled "Interactive Optical Fiber Amplifier, System And Method", discloses a system and method for selectively amplifying an optical signal, depending upon the amplification needs of the system. This invention adjusts amplifier gains controlled by remote systems so that an optical path in the system can be changed and automatic amplification provided. Nguyen has drawbacks, however, in that it requires a reflected power detector which adds to equipment costs and complexity. Additionally, the Nguyen invention does not address automatically adjusting amplifiers for ripple or remotely sensing chromatic dispersion.

U.S. Pat. No. 5,737,118 to Sugaya, et al., entitled "Optical Amplifying Apparatus", discloses a computer controlled optical amplifying apparatus which includes an optical amplifying unit including an optical amplifying controller which controls the amplifier. The controller disclosed by Sugaya monitors the status of the optical amplifier to report abnormal occurrences in relation to the relaxation time of the amplifier. The Sugaya invention, as with the other prior art inventions, does not address the need for the automatic characterization and correction for chromatic dispersion or continued operation of the amplifiers during a fault sequence.

U.S. Pat. No. 6,317,231 to Al-Salameh, et al., entitled "Optical Monitoring Apparatus And Method For Network Provisioning And Maintenance", provides for elimination of optical to electrical and electrical to optical signal conversion for monitoring certain maintenance functions of an optical network. The network controller provided analyzes the values of the optical signals to determine certain fault conditions and monitors certain channel power requirements. Additionally, the invention provides for monitoring signal noise ratio, channel continuity and network provisioning. Al-Salameh does not provide for automatic detection of chromatic dispersion or automatic adjustment of amplifier gain or tuning of components in the transmission system to eliminate the need for human intervention to correct system faults.

U.S. Pat. No. 6,163,392 to Condict, entitled "Distributed Intelligence Wavelength Division Multiplexed Network", provides for a fiber-optic communication network in which processors associated with each network element periodically transmit identification and status information to other processors in the network. In addition a service channel carries diagnostic and span topology information that can be transmitted through each span. While Condict does provide for information to be transmitted on a reserved wavelength, the information is limited to identification and status information and routing data. Condict does not disclose or suggest a system that provides for automatic detection of chromatic dispersion, automatic adjustment of amplifier gain or tuning of components in the transmission system to eliminate the need for human intervention to correct system faults.

U.S. Pat. No. 6,359,729 to Amoruso, entitled "Optical Communication System And Component Control Architectures And Methods", provides for control of optical components and network management. A component controller is configured to receive element instructions from an element manager and provides work function instructions to one or more work function controllers. The work function controller controls and monitors the work function pursuant to work function instructions provided by the component controller. Element instructions and other system information can be transmitted through the optical system using either a dedicated service channel or a mixed data channel carrying both communication traffic and system information. Amoruso does not disclose or suggest a system that provides for automatic detection of chromatic dispersion or automatic adjustment of amplifier gain or tuning of components in the transmission system to eliminate the need for human intervention to correct system faults.

Prior art systems suffer from the limitation that external measurement devices must be used by the operator to measure and correct for attenuation and dispersion. Also, the tuning of various components in the transmission system must be manually done by a system's operator. A further limitation of prior art systems is the length of time to restart the system after system failure. In some cases tuning and characterizing and correcting for attenuation and dispersion can take hours or days using the methods of the prior art.

SUMMARY OF THE INVENTION

The present invention addresses these problems by allowing transmission systems to perform required fiber characterization and correction, and to initiate, control and tune various components in the transmission system to operate at a desired efficiency in an automated fashion, thereby reducing equipment and personnel cost and providing for higher quality long haul fiberoptic transmission systems. The improvements address the limitations in the art described above, and provide more efficient and economical operation of the optical transport system.

In one aspect of the invention, an optical transport system with autodiscovery capability is taught.

In another aspect of the invention, an optical transport system with autoinventory capability is taught.

In another aspect of the invention, an optical transport system with autotopology capability is taught.

In another aspect of this invention, an optical transport system with autoprovisioning capability is taught.

In another aspect of this invention, an optical transport system with autocharacterization capability is taught.

In another aspect of this invention, an optical transport system with autotuning capability is taught.

The present invention provides an improved fiber optic network architecture which allows automated tuning and fiber characterization and correction of attenuation and chromatic dispersion along the fiber span. It allows for efficient collection and transfer of information regarding components in the transmission system and an optical fiber's attenuation and chromatic dispersion through a network of management controller's at each optical amplifier stage along the fiberoptic transmission line.

Each controller in a segment communicates with the others and with end terminals to forward information about performance measurements and characteristics of the components and optical fiber in the transmission system on an ongoing basis. Communication takes place over a reserved wavelength known as the service channel. The characteristics of each component and fiber are continuously analyzed so that corrections can be made automatically and continuously.

The present invention is an improvement over the prior art because it allows for automatic and remote analysis of and correction for components in the transmission system and for attenuation and remote analysis of chromatic dispersion of the fiber used in the transmission system. Automatically detecting and analyzing chromatic dispersion, attenuation, and components in the transmission system largely eliminates the need for manual attention to the system as required by the prior art. Also the current invention allows the system to be self contained and greatly self correcting thereby drastically reducing the time required to recover for a system failure or initial system startup. The system contains the necessary scheme to bring an amplifier up to an active state. Also, the system can monitor the optical spectrum and adjust the spectrum to bring it into a given band.

A further improvement of this invention over the prior art is that it allows the fiberoptic transmission system to be flexible and responsive to changes in fiberoptic cables and component aging or failure. For instance, if a cable is damaged and needs to be replaced, the optical characteristics of the cable will change slightly. An additional change might be the addition of a cable link or the addition or deletion of another optical component which changes the transmission characteristics of the entire system. The present invention allows the fiberoptic transmission system to be automatically responsive to these changes.

A further improvement of this invention over the prior art is that it allows the fiberoptic transmission system to be flexible and responsive to changes in the amount and character of the traffic that is present on the optical transport system. A change in the amount of traffic on the optical system may be a newly deployed or provisioned channel. The present invention allows the fiberoptic transmission system to be automatically responsive to these changes.

A further advantage of the present invention is that it allows longer spans to be accomplished between regeneration stations or optical amplification stations. This is because of the more frequent and accurate compensation for fiber nonlinearities at each optical amplifier stage.

All of the above advantages allow a long haul fiberoptic system outfitted with the invention to be operated with lower maintenance cost and fewer personnel, and results in operational cost savings to the user.

The invention will be better understood from the following more detailed description taken in conjunction with the accompanying drawings.

BRIEF DESCRIPTION OF THE DRAWINGS

FIG. 21 is a flow chart of the preferred embodiment for automated channel turn down.

DETAILED DESCRIPTION

Figure 1:
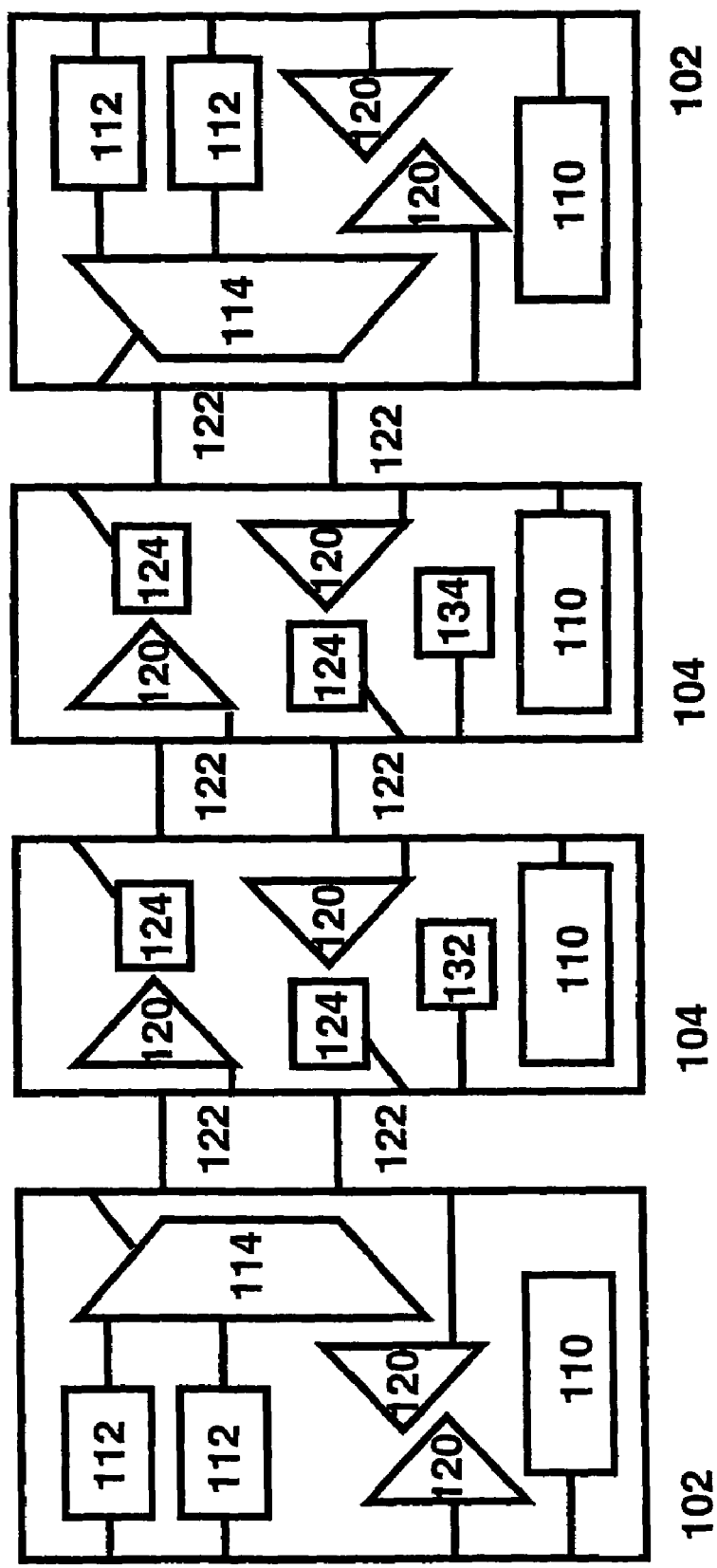
FIG. 1 is a graphical depiction of an automated optical transport system in accordance with the invention.

While the making and using of various embodiments of the present invention are discussed in detail below, it should be appreciated that the present invention provides many applicable inventive concepts which can be embodied in a wide variety of specific contexts. The specific embodiments described herein are merely illustrative of specific ways to make and use the invention and do not delimit the scope of the invention.

In the descriptions that follow, like parts are marked throughout the specification and drawings with the same numerals, respectively. The drawing figures are not necessarily drawn to scale and certain figures may be shown in exaggerated or generalized form in the interest of clarity and conciseness. Reference of an A-Z signal or downstream direction means from the left side of the drawing to the right side of the drawing while Z-A or upstream means from the right side to the left side. Unless otherwise stated, signals propagate in an A-Z direction. The A-Z, Z-A, upstream or downstream designation is used for illustrative purposes only.

Hardware Architecture

FIG. 1 is an illustrative block diagram of an optical transport system for data and/or voice transmission used to support the present invention. Shown in the figure is a duplex system in which traffic is both transmitted and received between parties at opposite end of the link. The optical transport system shown in FIG. 1 is comprised of terminal stations 102, and optical amplifier stations 104. Terminal stations 102 are further comprised of transceiver cards 112, multiplexer-demultiplexer cards 114, optical amplifier cards 120 and management card 110. In terminal station 102, transceiver cards 112, optical amplifier cards 120 and multiplexer-demultiplexer cards 114 are connected to management card 110 by an electronic data bus.

Optical amplifier stations 104 are further comprised of optical amplifier cards 120, dispersion compensation cards 124 and management card 110. Optical amplifier station 104 may also include an optical spectrum analyzer card 132. Optical amplifier station 104 may also include a dynamic gain equalizer card 134. In optical amplifier station 104, optical amplifier cards 120, and dispersion compensation cards 124 are connected to management card 110 by an electronic data bus.

Terminal stations 102 and optical amplifier stations 104 are connected by fiber spans 122. Management card 110 in neighboring stations are connected by an optical service channel. In a preferred embodiment, said optical service channel comprises an optical data link that propagates on fiber span 122. More specifically in a preferred embodiment, said optical data link comprises a 1 Gbps Ethernet optical data link. In a preferred embodiment, said optical data link counter-propagates to the optical traffic moving between terminal stations 102.

Figure 2:
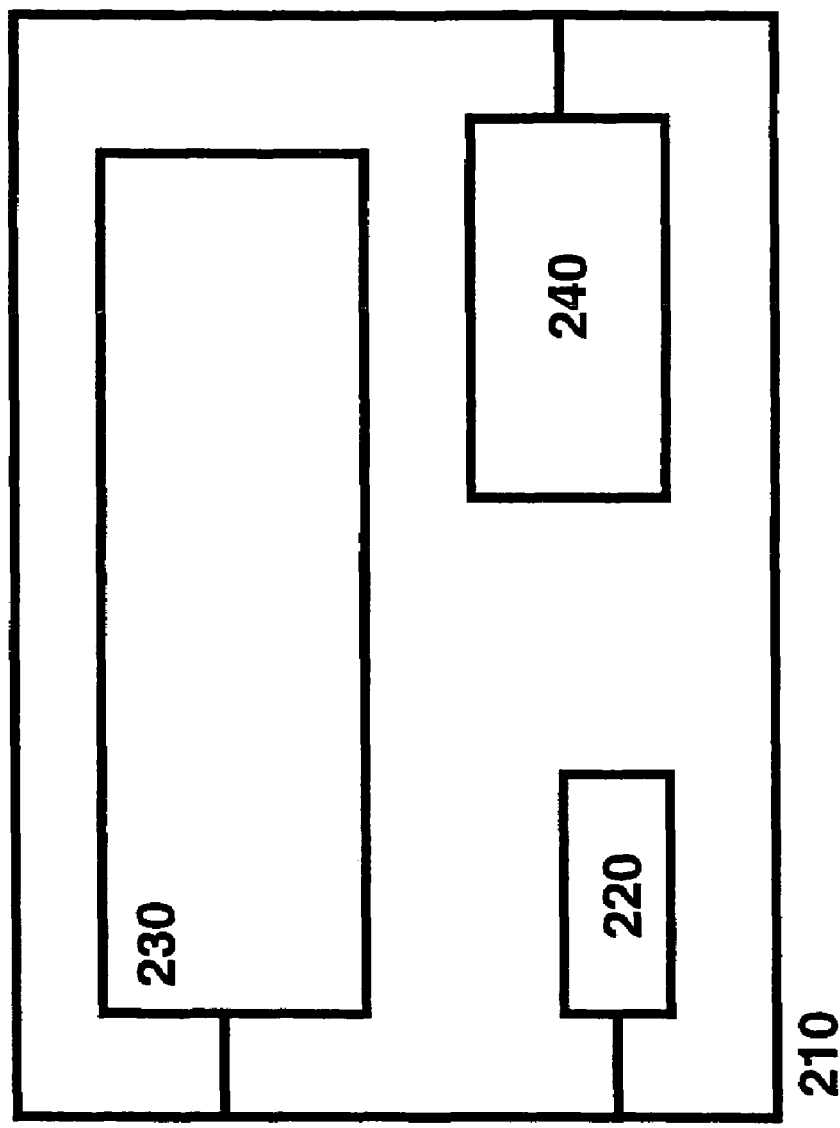
FIG. 2 is a graphical depiction of a line card in accordance with the invention.

In FIG. 2 is a schematic representation of the architecture of a line card 210. Examples of line card 210 include said transceiver card 112, multiplexer-demultiplexer card 114, optical amplifier card 120, dispersion compensation card 124, optical spectrum analyzer card or dynamic gain equalizer card (all as shown in FIG. 1). As shown in FIG. 2, line card 210 generally comprises photonic block 230, microcontroller block 220 and power supply block 240. Photonic block 230 provides the specific photonic functionality of the linecard. For example, in transceiver card 112, photonic block 230 comprises a laser transmitter, a photodetector receiver, and digital and RF electronics to perform the task of transmitting and receiving high bit rate optical signals. For example, in multiplexer-demultiplexer card 114, photonic block 230 comprises optical multiplexing and demultiplexing elements, such as thin film filters, interleavers, or array waveguides. In a preferred embodiment of this invention, multiplexer-demultiplexer card includes a receiving variable optical attenuator (RVOA) for adjusting the power of the received signals in a variable manner, and a transmitting variable optical attenuator TVOA for adjusting the power of the transmitted signals in a variable manner. For example in optical amplifier card 120, photonic block 230 comprises optical amplifiers such as erbium doped fiber amplifiers or semiconductor optical amplifiers. For example in a dispersion compensation card, photonic block 230 comprises dispersion compensator modules including specially doped optical fiber, or multimode fiber to provide chromatic or polarization dispersion compensation. For example in an optical spectrum analyzer card, photonic block 230 comprises an optical spectrum analyzer such as a tunable fabry-perot optical spectrum analyzer or a grating-photodetector based optical spectrum analyzer. For example in a dynamic gain equalization card, photonic block 230 comprises a dynamic gain equalizer such as a liquid crystal based dynamic gain equalizer or a micro-electromechanical based dynamic gain equalizer. In a preferred embodiment power block 240 is comprised of dc-dc power converter integrated circuitry. As will be discussed in reference to FIG. 3 below, in line card 210, microcontroller block 220 comprises memory, a microprocessor or a microcontroller, or an eeprom sufficient to provide inventory information, and control of the photonic block.

Figure 3:
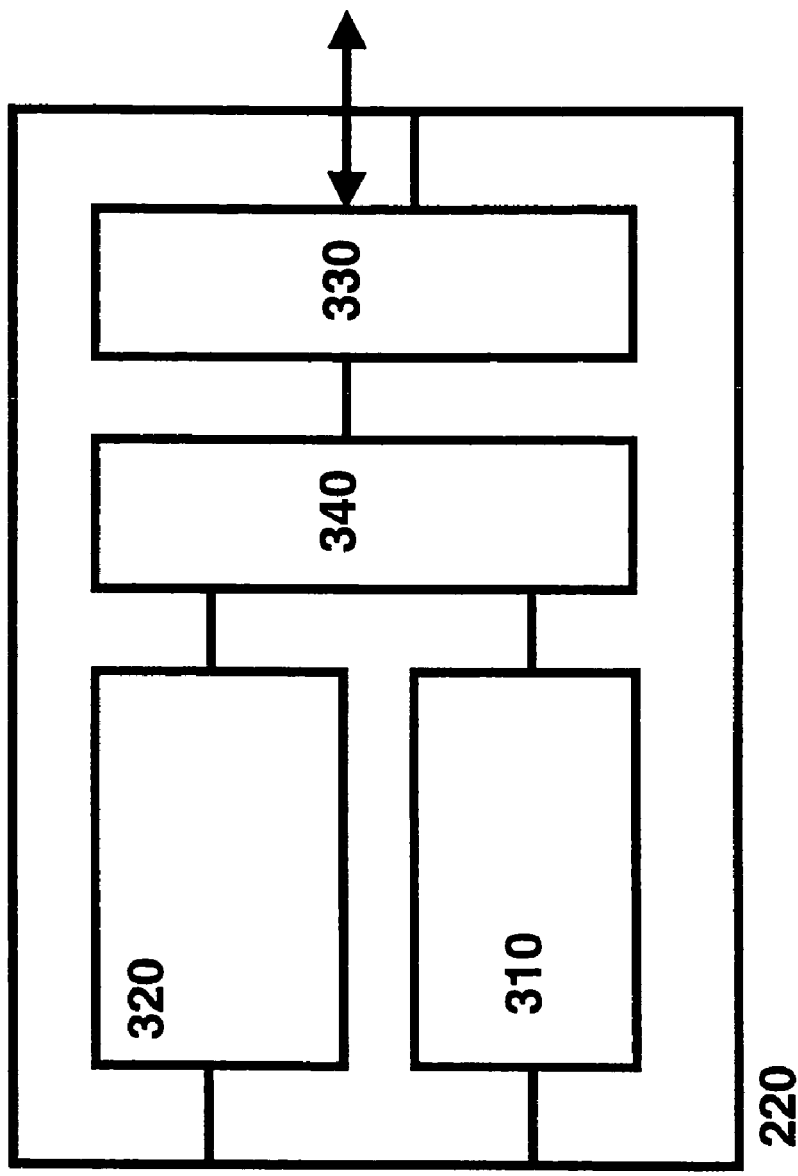
FIG. 3 is a graphical depiction of a microcontroller block in accordance with the invention.

In FIG. 3 is a schematic representation of microcontroller block 220. As shown in FIG. 3 microcontroller block comprises electronic memory 310, microcontroller 320, input-output interface 330, and integrative logic 340. In a preferred embodiment, electronic memory 310 is realized by programmable memory integrated circuitry and random access memory integrated circuitry. In a preferred embodiment, microcontroller 320 may be realized by a microprocessor integrated circuit, or a microcontroller integrated circuit. In a preferred embodiment integrative logic 340 may be realized by field programmable gate array integrated circuitry. In a preferred embodiment input-output interface 330 may be realized by electronic data bus and electronic transmission logic. Electronic memory 310, microcontroller 320, input-output interface 330 and integrative logic 340 are mechanically and electronically connected in a functional manner in enable the cooperative functioning of said blocks. In a preferred embodiment electronic memory 310, microcontroller 320, input-output interface 330 and integrative logic 340 reside on a printed circuit board. Input-output interface 330 provides functional connectivity to photonic block 220, and also to management card 110.

Figure 4:
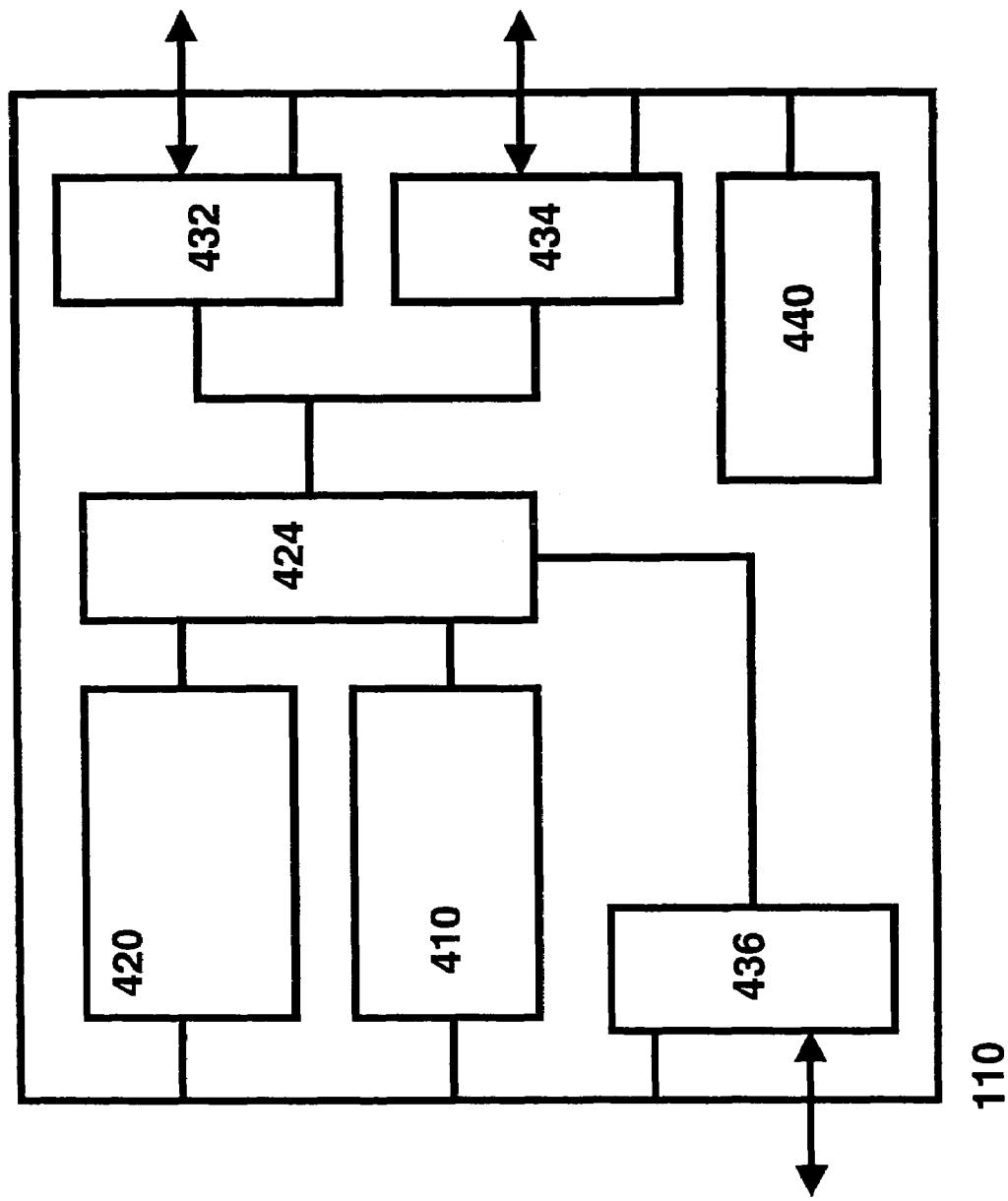
FIG. 4 is a graphical depiction of a management card in accordance with the invention.

In FIG. 4 is a schematic representation of management card 110 in accordance with the invention. Management card 110 is comprised of electronic memory 410, microprocessor 420, integrative logic 424 and power block 440. Management card 110 is further comprised of user interface 436, electronic interface 432 to input-output interface 330 (shown in FIG. 3) residing in line cards located at the station where the management card is located, and optical service channel interface 434 to management cards 110 at adjacent or neighboring stations. Electronic memory 410, microprocessor 420, integrative logic 424, power block 440, user interface 436, electronic interface 432 and optical service channel interface 434 are mechanically and electronically connected in a functional manner in enable the cooperative functioning of said blocks. In a preferred embodiment electronic memory 410, microprocessor 420, integrative logic 424, power block 440, user interface 436, electronic interface 432 and optical service channel interface 434 reside on a printed circuit board.

In a preferred embodiment electronic memory 410 is realized with programmable memory integrated circuits and random access memory integrated circuits. In a preferred embodiment microprocessor 420 is a microprocessor integrated circuit such as a Pentium microprocessor from Intel. In a preferred embodiment, the microprocessor is operated using the Unix operating system. In a preferred embodiment integrative logic 424 is comprised of field programmable gate array integrated circuitry. In a preferred embodiment power block 440 is comprised of dc-dc power converter integrated circuitry. In a preferred embodiment, user interface 436 is realized through a variety of connections and supporting logic integrated circuitry. Examples of these connections realized in a preferred embodiment include an RJ-45 interface, or an infra-red LED port. These connections enable an external computer to interact with the microprocessor on the local management card 110, or any other management card connected through the optical service channel interface 434. Optical service channel interface 434 is realized in a preferred embodiment by a 1 Gbps Ethernet data link and the supporting logic integrated circuits, including a gigabit interface converter (GBIC). For additional range between adjacent stations, the optical service channel interface may be capable of decoding and encoding forward correcting codes (FEC) such a repeat code or parity checks as known in the prior art. The encoder in the preferred embodiment introduces a redundancy to the input data before transmission. The decoder uses this redundancy to reconstitute the input sequence even in the presence of transmission errors, provided the frequency of errors is less than a threshold defined as the power of the code. The decoder and encoder in other embodiments of the invention may also use a more powerful set of codes which is linear block codes, convolution codes or threshold and sequential codes. In the preferred embodiment, the decoder and encoder are incorporated into the GBIC, as is well known in the art. The communication protocol in a preferred embodiment is TCP/IP. TCP/IP protocol is well known in the art and will not be discussed further here. It should be understood that other operating systems and protocols can be utilized in the invention with equal success.

In a preferred embodiment the optical service channel propagates between adjacent stations on fiber strands 122 at a wavelength distinct from the terminal traffic. In a preferred embodiment the optical service channel counter-propagates to the terminal traffic.

FIG. 1, FIG. 2, FIG. 3 and FIG. 4 may now be used to teach the operation of an automated optical transport system that provides auto-discovery capability, auto-inventory capability, and auto-topology capability. When a line card 210 is installed into a station shelf, the microcontroller block 220 establishes communication with management card 110 located at that station. Local management card 110 located at the station discovers the line card 210, records the presence of line card 210, determines the location of line card 210 and updates its inventory file. Local management card also transmits the presence of line card 210, the location of line card 210, and the updated inventory file using optical service channel interface 434. Management cards 110 at adjacent stations receive the updated inventory files, and broadcasts them to the next neighboring management cards 110. In this manner each management card at each station automatically maintains inventory and topology information of the optical transport system.

Figure 5:
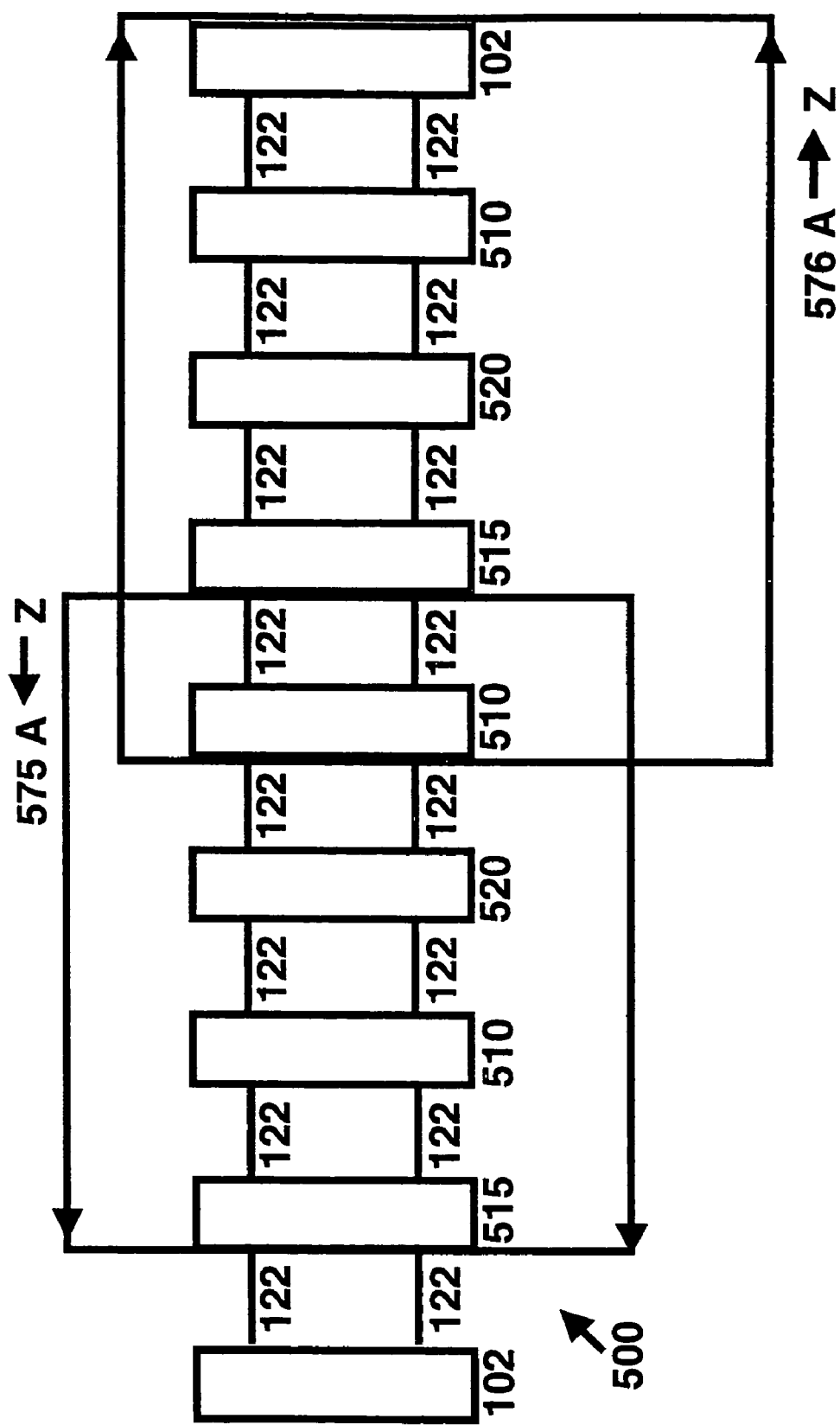
FIG. 5 is a graphical depiction of the network arrangement of the invention including end terminals and segments.

To better understand how the autotuning process works, the architecture of the preferred embodiment will now be described. A high level graphical view of the preferred embodiment of the invention is shown in FIG. 5 as system 500. The preferred embodiment of the architecture of this system is set up to require at least two end terminal stations 102. In FIG. 5, terminal stations 102 are connected by a plurality of fiber spans 122, and optical amplifier stations 510, optical amplifier and analyzer stations 515, and optical amplifier and equalizer stations 520. A preferred embodiment of this invention requires that at least one segment be defined. In the Z-A direction, a segment is shown as 575. It will be clear from the drawing that the beginning and end of a segment is defined by the placement of the optical amplifier and analyzer stations 515, and may include optical amplifier and equalizer station 520. In the A-Z direction, a second segment 576 is shown. At terminal station 102, it is possible to read the power at each channel thus providing the same information as an OSA. In this segment, the functions of the OSA are available at the receiver in terminal station 102; therefore, the segment 576 terminates with terminal station 102 even though an OSA is not present. If an OSA is present, then, of course, information from it may be used. Each segment can span up to 1000 km providing for a long transmission system that can be responsible for transmitting 5000 to 7000 km between terminal stations 102. The lengths of the cable described are for illustration purposes only and is not meant to be limiting.

Figure 6:
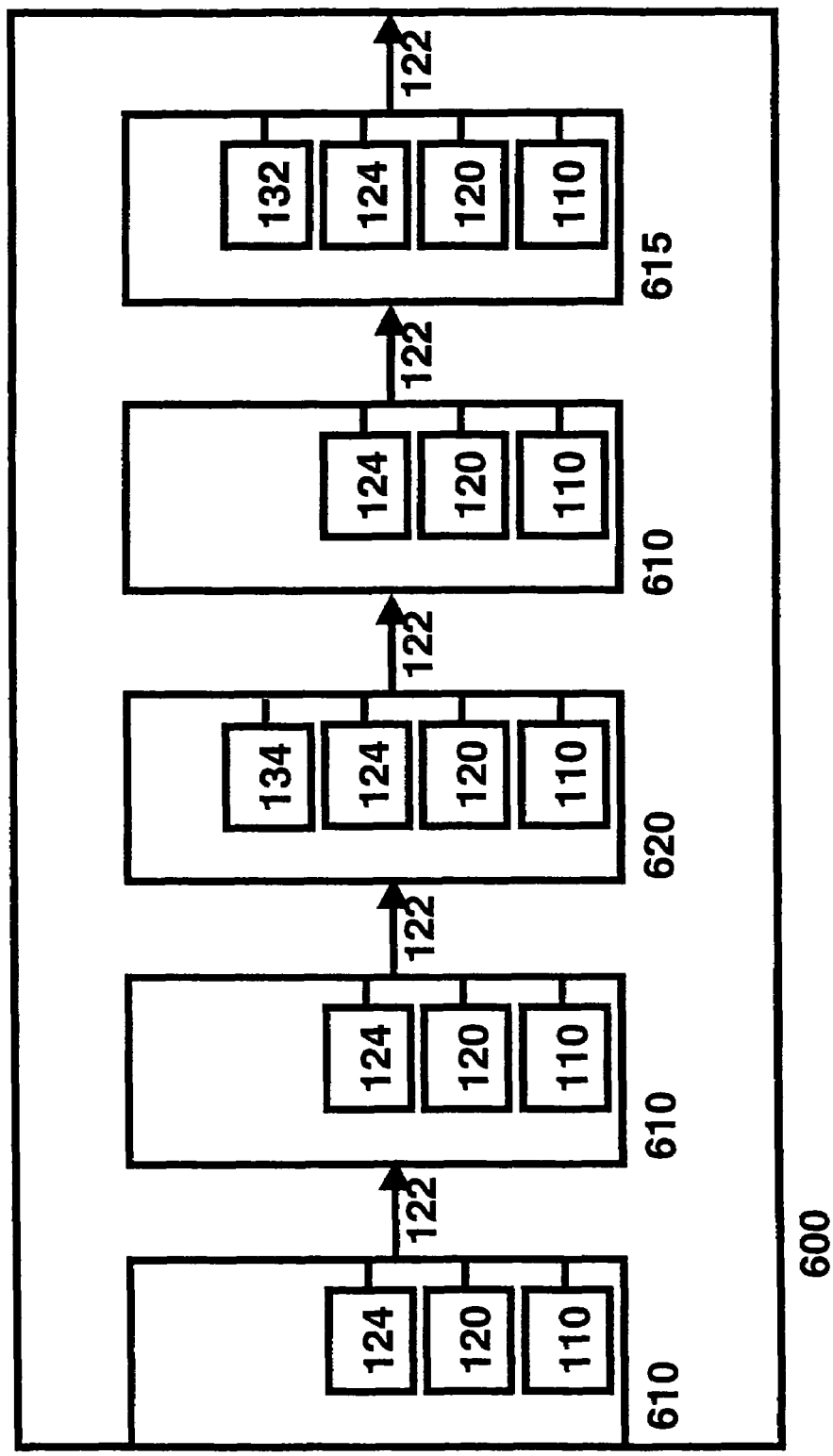
FIG. 6 is a graphical depiction of a single segment of the invention.

FIG. 6 shows an expanded block diagram of a single segment of the preferred embodiment of the invention as 600. Segment 600 includes 5 amplifier stations with spans of up to 130 km of optical fiber between each pair of amplifiers.

The "stream" of the customer traffic data signal is indicated as A to Z; therefore, the amplifiers to the left in the drawing are "upstream" to those to the right, which are referred to as "downstream." It should be understood that each segment 600 is duplicated for each direction of data flow. Only one direction is shown for simplicity of description.

This preferred embodiment of the architecture of segment 600 includes three upstream amplifier stations 610, one upstream optical amplifier and equalizer station 620, and one downstream optical amplifier and analyzer station 615. Upstream optical amplifier stations 610 and upstream optical amplifier and equalizer station 620 act as "slave" stations in the autotuning process. Downstream optical amplifier and analyzer station 615 acts as a "master" station in the autotuning process.

With respect to the autotuning software process optical amplifier station 610 comprises management card 110, optical amplifier card 120 for amplifying optical signals traveling in the A-Z direction, and dispersion compensation card 124 for compensating the dispersion in fiber spans 122 for optical signals traveling in the A-Z direction. Optical amplifier and equalizer station 620 comprises management card 110, optical amplifier card 120 for amplifying optical signal traveling in the A-Z direction, dispersion compensation card 124 for compensating the dispersion in fiber spans 122 for customer traffic optical signals traveling in the A-Z direction, and further comprises dynamic gain equalizer card 134 for equalizing the power or optical signal to noise ratio in each channel in the optical signal traveling in the A-Z direction. Optical amplifier and analyzer station 615 comprises management card 110, optical amplifier card 120 for amplifying customer traffic optical signal traveling in the A-Z direction, dispersion compensation card 124 for compensating the dispersion in fiber spans 122 for customer traffic optical signals traveling in the A-Z direction, and further comprises an optical spectrum analyzer 132 for measuring the power or optical signal to noise ratio in each channel in the customer traffic optical signal traveling in the A-Z direction.

Figure 7:
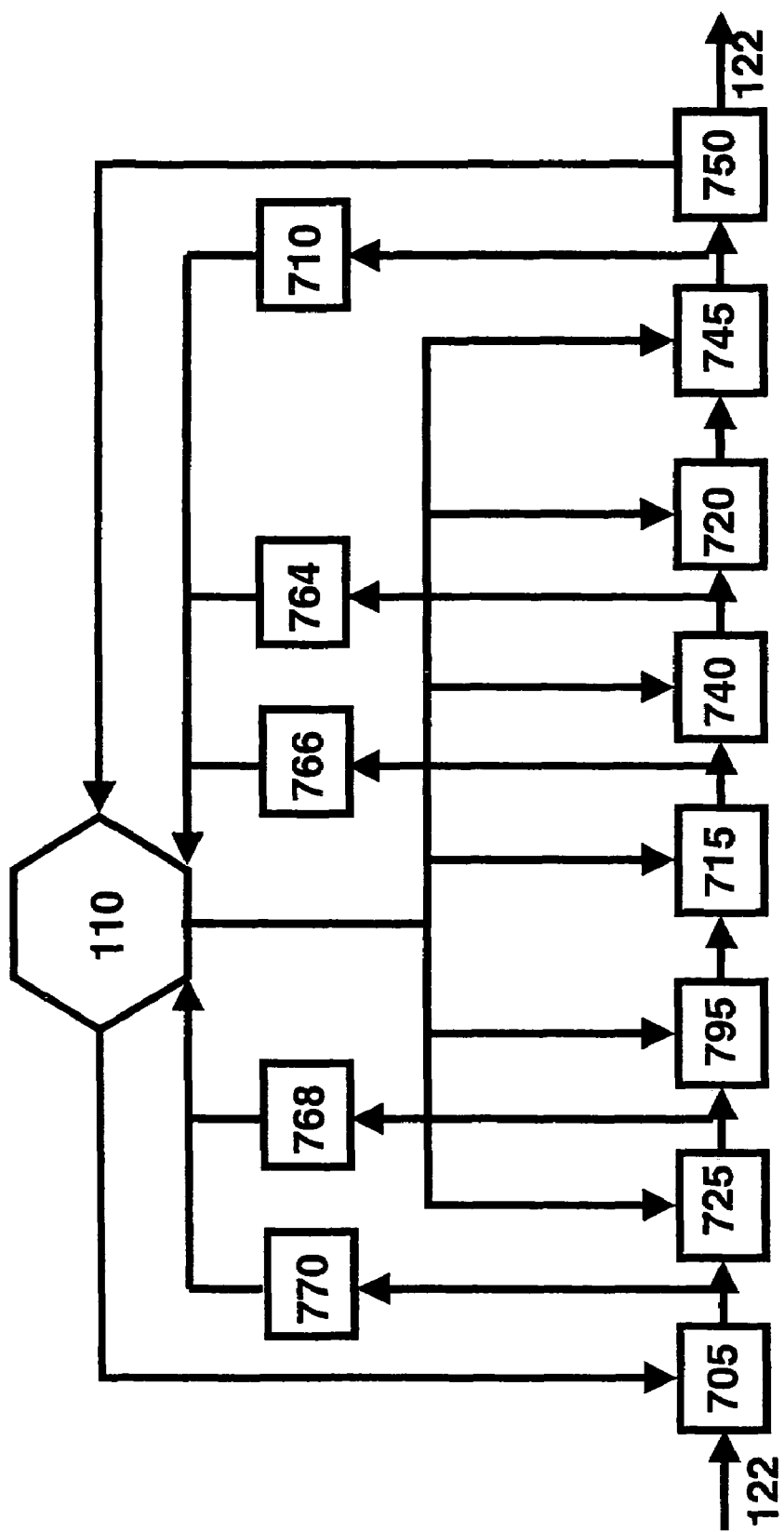
FIG. 7 is a graphical depiction applicable to optical amplifier station 610, optical amplifier and analyzer station 615, and optical amplifier and equalizer station 620.

The architecture of optical amplifier station 610, optical amplifier and analyzer station 615, and optical amplifier and equalizer station 620, are similar, and each may be understood from FIG. 7 which shows a schematic view applicable to optical amplifier station 610, optical amplifier and analyzer station 615, and optical amplifier and equalizer station 620 with variation according to system requirements.

Referring now to FIG. 7, in optical amplifier and equalizer station 620, customer traffic flows from A to Z on fiber span 122 through circulator 705, through first stage erbium doped fiber amplifier 725, through variable optical attenuator 795, through dispersion compensation block 715, through second stage erbium doped fiber amplifier 740 through dynamic gain equalizer 720, through third stage erbium doped fiber amplifier 745 and circulator 750. Optical amplifier and equalizer station 620 further comprises reader 764, reader 766, reader 768 and reader 770. Reader 764, reader 766, reader 768 and reader 770 are optical-to-electrical transducers which monitor the power in the customer traffic optical data signal. In a preferred embodiment, reader 764, reader 766, reader 768 and reader 770 are implemented by semiconductor photodetectors. Optical amplifier and equalizer station 620 may also further comprise optical spectrum analyzer 710. Optical amplifier and equalizer station 620 further comprises management card 110. Management card 110 provides control for first stage erbium doped fiber amplifier 725, variable optical attenuator 795, dispersion compensation block 715, second stage erbium doped fiber amplifier 740 in response to input from reader 764, reader 766, reader 768 and reader 770, input readings from first stage erbium doped fiber amplifier 725, input readings from variable optical attenuator 795, input readings from dispersion compensation block 715, second stage erbium doped fiber amplifier 740, stored values, including calibration data, and information from receiving the optical service channel. For example, management card 110 uses the electrical signals from reader 764, reader 766, reader 768 and reader 770 to check input and output viability of the optical signal, calculate EDFA gain and to measure input power to the amplifier in order to calculate fiber loss.

In this preferred embodiment, circulator 705 is used to inject an optical service channel signal originating from management card 110 onto fiber span 122 for propagation to the adjacent upstream station. Circulator 750 is used to extract an optical service channel signal from fiber span 122 propagating from the adjacent downstream station. The optical service channel signal from circulator 750 is received at management card 110.

Optical amplifier station 610 will not include dynamic gain equalizer 720, and will not include third stage erbium doped fiber amplifier 745.

Optical amplifier and analyzer station 615 will necessarily include the optical spectrum analyzer 710.

First stage erbium doped fiber amplifier 725 and second stage fiber amplifier 740 are controlled by management card 110 to optimize the gain for the entire amplifier station. The first and second stages necessarily result in "tilt" or linear variance in amplification according to frequency. Each type of optical amplifier has a characteristic tilt. The amplifiers may have their tilt adjusted by systematically changing the gain for each wavelength amplifiers or through variable optical attenuator 795. The amplifiers also demonstrate gain "ripple". "Ripple" is a nonlinear effect which results from the erbium gain shape in the two stages.

In a preferred embodiment, dispersion compensation module 715 may include a number of sub-modules in which various length spans of dispersion compensation fiber are contained. In this preferred embodiment, dispersion compensation module 715 also includes a programmable read only memory ("EPROM"). Upon installation of VDCM 715, the EPROM is programmed to contain the approximate value of the dispersion compensation contained in the dispersion compensation module. The EPROM may be read by management card 110 to determine the compensation available.

Management card 110 is responsible for initially setting the gain of first stage erbium doped fiber amplifier 725 and setting the gain of second stage erbium doped fiber amplifier 740 on system startup and reading the values of the dispersion compensation available in the EPROM. This information is stored in memory 410 and communicated, via TCP/IP protocol to master station 615. Management card 110 is also responsible for continually updating master station 615 with gain settings and dispersion compensation values periodically during operation of the network system 510. Additionally, management card 110 is responsible for implementing commands from master station 615 with regard to resetting the gain of first stage erbium doped fiber amplifier 725 and resetting the gain of second stage erbium doped fiber amplifier 740. This process will be described in detail later.

Software Architecture

Figure 8:
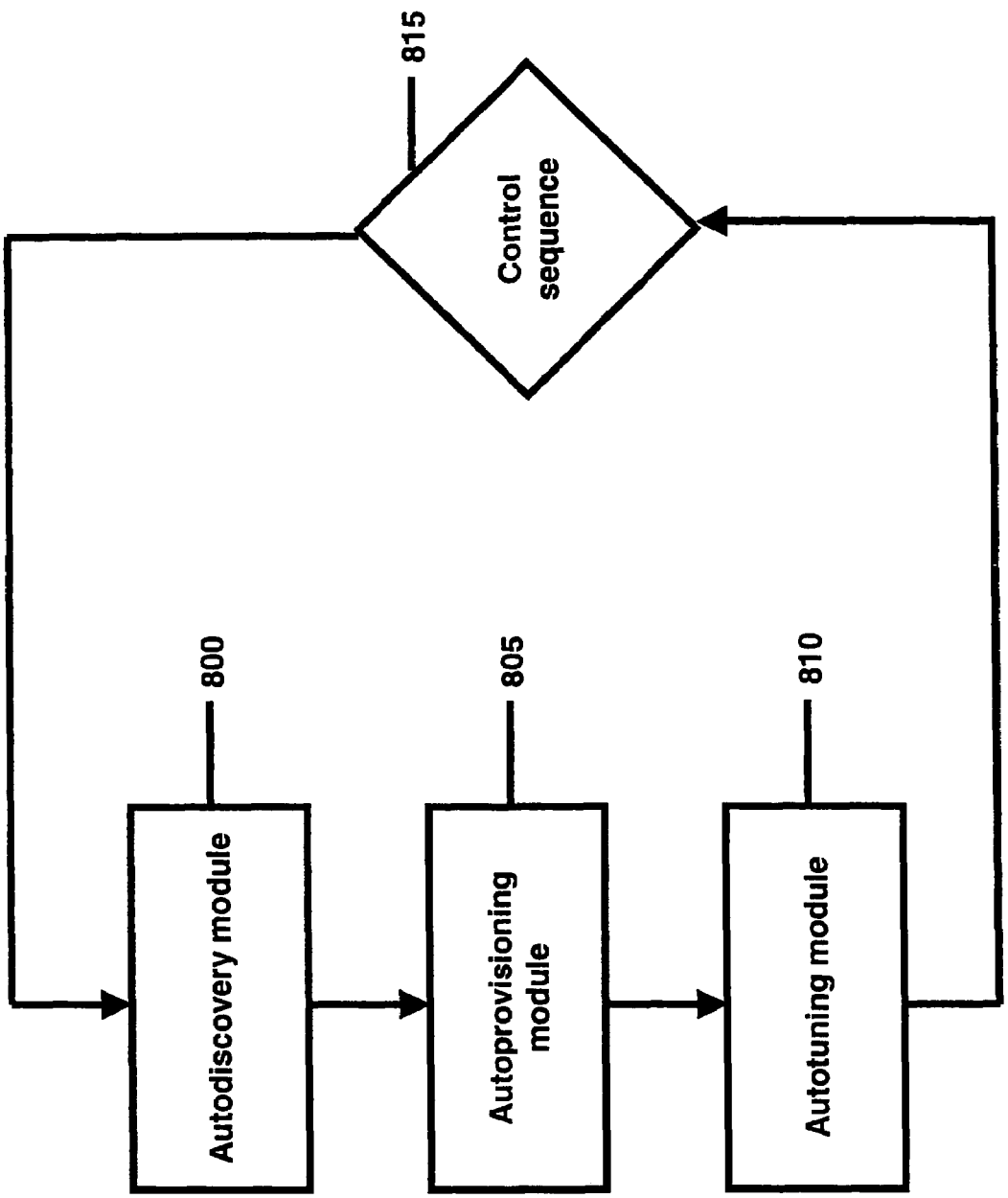
FIG. 8 is a flow chart of the steps undertaken by the current invention.

FIG. 8 shows a flowchart of the basic modules used in the autotuning process, topology discovery module 800, provisioning module 805, autotuning module 810 and control sequence 815. The modules 800, 805 and 810 are all located in management card controller 110, are present at each station in the system 510 and can be controlled using the Unix operating system.

Control sequence 815 initiates the autotuning process.

Topology discovery module 800 provides a fiber wavelength topology view of system 500 and provides status and configuration information for the key components required for proper function of system 500. Topology discovery module 800 also controls the discovery process and builds, propagates and maintains a database called topology tree. The topology tree database is stored in memory 410 of management card 110. In the preferred embodiment, the topology tree contains information required for autotuning by provisioning module 805 such as node type and components on the node as well as other information not related to autotuning such as node name given by the user and software versions being used in the various components of the node. The discovery process is based on open shortest path first (OSPF) topology propagating methods and contains logic to detect specific station changes. The module also can propagate information about changes throughout the network.

Provisioning module 805 contains the logic to support the provisioning of a logical circuit or optical channel from an endpoint. Provisioning module 805 contains the logic to turn up a circuit, or bring a circuit into service, and turn down a circuit, or remove a circuit from service. This includes the initiation and cessation of pseudo random binary sequence ("PRBS") signals on the circuit. The logic used can determine primary and secondary service states. Primary service states include in service or out of service. Secondary services states include out of service due to testing or out of service due to tuning. While provisioning module 805 is present on all stations, provisioning module 805 only runs on end terminal stations 102.

Provisioning module 805 examines the topology tree created by topology discovery module 800 and stored in memory 410 of management card 110 and other functions such as validating channels and optical paths. Provisioning module 805 also tests various components to ensure they are in a workable order. In addition, provisioning module 805 initiates autotuning module 810.

Autotuning module 810 communicates with variable optical attenuators in multiplexer-demultiplexer cards, variable optical attenuators 795, management cards 110, optical spectrum analyzers 710, optical amplifiers 120, dynamic gain equalizers 134, etc., and determines if a station is a "slave" or "master". Autotuning module 810 handles and tunes Raman amplifiers when they are necessary to compensate for higher span losses.

Autotuning module 810 contains the logic to execute tuning scenarios based upon topological conditions and as well as bringing up a wavelength or optical channel path between two end points. In addition, autotuning module 810 contains the logic to bring an optical device such as optical amplifier 120 into and out of service.

In order for system 500 to perform autotuning, provisioning module 805 will direct autotuning module 810 to turn up autoprovisioned wavelengths or manually provisioned wavelengths. To control provisioning and autotuning of optical channels, provisioning module 805 is dependent on the set of state and configuration data created by topology discovery module 800. The state and configuration data is stored both in a specific node's database and can be used by a local provisioning module 805 on the specific node where the database is located and in the topology tree database and therefore available to all network elements. In the alternative, the data is stored in a local configuration database in memory 410. From this information the system can recognize if the system has been previously tuned or if it is exercising an initial tune-up. Also, each station can automatically determine its function in the system.

The default behavior of system 500 is for segment 575 to be auto-tuned rather than manually tuned. This allows system 500 to be built and activated without having to be initially manually tuned.

Several triggers initiate control sequence 815 to initiate autotuning. For instance, the discovery process begins in a single AZ direction when the system is first turned on. Each station uses basic Ethernet protocol TCP/IP to determine what type of station it is and where the upstream and downstream neighbors are. This can be accomplished because on every station is a shelf containing at least one management card 110 and on each management card 110 is an identifier identifying the shelf type. Once the shelf type of the station is known, management card 110 does an inventory of the shelf to ensure all the components are in good working order. After management card 110 determines the inventory and shelf type, a modified OSPF signal is sent telling all management cards 110 in the system the shelf type of each station. Once all management cards 110 know what shelf type each station has, initial topology discovery is completed and topology tree is built and stored in memory 410 of each management card 110. A new topology database will not be built until a predefined triggering event takes place.

Other events that trigger control sequence 815 to initiate topology discovery module 800 and create a new topology database include change of state or topology, user command, an idle period expiration, insertion or activation of a new optics card module, such as optical amplifier 120, or optical spectrum analyzer 710, optical hardware change, such as a card reset or hardware failure, and changes of optical topology, such as adding or turning up a wavelength or dropping or turning down a wavelength. In addition, the system can periodically refresh itself to ensure it does not miss any topological changes due to temporary disconnects, packet loss, bugs, etc.

Failure of different components can be recognized by control sequence 815 by recognizing different system responses. If the topology changes because of a failure of an optical spectrum analyzer 710, then topology discovery module 800 is triggered and a new topology tree database is built. The failure will propagate through the topology as the next optical spectrum analyzer 710 downstream from the failed optical spectrum analyzer 710 begins receiving signals measurably different from the signals received before the failure. If the failed optical spectrum analyzer 710 is at a terminal station 102 there will be at most degraded tuning available through discrete devices on that final segment. In the event of an optical amplifier 120 failure, tuning will be degraded for that segment 575 by treating the station where the amplifier failed as if it were not adjustable. In the event of a dynamic gain equalizer 720 failure, tuning will significantly degrade for that segment and the only adjustments would be spectrum wide adjustments on all optical amplifiers 120.

Autotuning can be disabled on a per-segment or per station basis by the user. If a slave station is manually turned off, then master station must avoid sending tuning messages to it. If master station is manually turned off, this effectively turns off tuning on all stations on the segment except for the master station. Manual controls allow disabling in a single direction or disabling particular devices or parameters.

The user can explicitly disable autotuning by entering the appropriate commands into the Unix operating system. The user commands are communicated via TCP/IP protocol between management cards 110 in the network using a control data channel or management channel on the optical fiber. A user request to disable autotuning results in the disablement of autotuning module 810 of the segment if the station that receives the request is a master station, otherwise the user requested disablement results in the disablement of autotuning module 810 for the station for those parameters or channels that are manually tuned. Autotuning module 810 will autotune "around" the stations that have been disabled. In other words, adjustments will not be made to a disabled station.

Autotuning module 810 allows for fixed settings on first stage erbium doped fiber amplifier 725, second stage erbium doped fiber amplifier 740, dynamic gain equalizer 720, third stage erbium doped fiber amplifier 745, or other optical device and can tune as well as possible around any settings that have been manually fixed by the user or due to malfunction.

Autotuning module 810 provides events to notify other management subsystems of important activities of the tuning process and any information associated with those activities. These events may include, but are not limited to, tuning finished and tuning successes, failures and canceling, tuning started, wavelength turn up or turn down completed, unable to converge and/or span loss over user configurable thresholds.

All changes made by the autotuning process during normal operation of the system are limited to less than a maximum instantaneous change value, such as 0.25 dB's and some maximum change bandwidth such as 2 dB/sec. for 0.25 dB/change at 10 Hz. Any changes greater than the above may be broken into smaller sub-changes so as to avoid data corrupting excursions and the prior levels reaching terminal station 102. It is preferable to have as little time as possible between the recognition of an optical spectrum issue and initiating the autotuning sequence.

Any failures detected are reported to management card 110. Such failures should include, but are not limited to, excessive span loss, loss of an expected wavelength in the spectrum, excessive power tilt, inability to bring spectrum into an appropriate band, hardware or software failure of a tuning station or tuning communications failure. The method for detecting and reporting of such failures is known in the art and will not be discussed further.

If management card 110 receives a reported failure signal, management card 110 will initiate trigger control sequence 815 to initiate topology discovery module 800 to build a new topology tree database. If management card 110 cannot initiate trigger control sequence 815, then the reported failure signal will be transmitted to a node that can initiate trigger control sequence 815.

The autotuning tuning control system is comprised of several processes running on the line card and management cards. In the preferred embodiment, all such processes communicate via an interprocess communication (IPC) programming interface. Use of IPC programming interfaces are known in the art. A different set of programming interfaces that can handle many user requests at the same time and allows individual program processes to run concurrently in an operating system may also be used. IPC messages are handled both while idle and while tuning. These messages can cause tuning to start and stop at anytime. The messages are handled asynchronously in the same thread as tuning calculations discussed below. For example, the process may include waiting for a message, processing the message and making any necessary tuning changes and starting any necessary tuning tasks, then during any tuning tasks, process any further IPC messages, if necessary canceling the current tuning cycle in order to act on a new message, then going back and waiting for a message.

Autotuning module 810 performs the actual tuning algorithm using the topology tree database as a reference. In order to control the optics for tuning, master station communicates with management card 110 on master station 910 (as will be further described in relation to FIG. 9) in order to change settings or make readings. To communicate with management cards 110 on slave stations 905, master station 910 sends remote IPC messages to management card 110 on the same shelf as the relevant optics to be tuned. The tuning control process on slave station 905 does not perform any tuning actions other than observing the topology and becoming a master station 910, if necessary.

As shown in FIG. 7, optical amplifiers 120 may be erbium doped fiber amplifiers with several stages. For example, first stage erbium doped fiber amplifier 725 and second stage erbium doped fiber amplifier 740. Each stage has an independent gain setting. One or two stage erbium doped fiber amplifiers can act as a single stage amplifier regardless of the hardware present. Management card 110 contains the necessary algorithm for first stage erbium doped fiber amplifier 725 and second stage erbium doped fiber amplifier 740 to act as one. Such algorithms are known in the art. Optical line amplifiers 120 may also be more than two stages.

Management card 110 is the control point for all tuning operations. The autotuning software is stored on management card 110. Upon start up, management card 110 uses topology discovery module 800 and determines its station designation in system 500 which is dependant upon position in the system 500 and the equipment installed on each station where management card 110 is located. Following the determination, management card 110 determines if the station the controller operates on is either a "master station" or "slave station" (as will be further described later).

Below, various tuning procedures are discussed. Headings are used for reference purposes only and are meant to be not limiting. The tuning procedures used are implemented by management card 110 based on the autotuning software located in management card 110.

Initial Erbium Doped Fiber Amplifier Turn Up

The procedure for initially turning up optical amplifier 120 requires knowledge of the correct output power at previous amplifier 120 and approximate knowledge of the amplifier's noise. Previous amplifier 120 is the amplifier directly upstream from the current amplifier being turned up.

Figure 12:
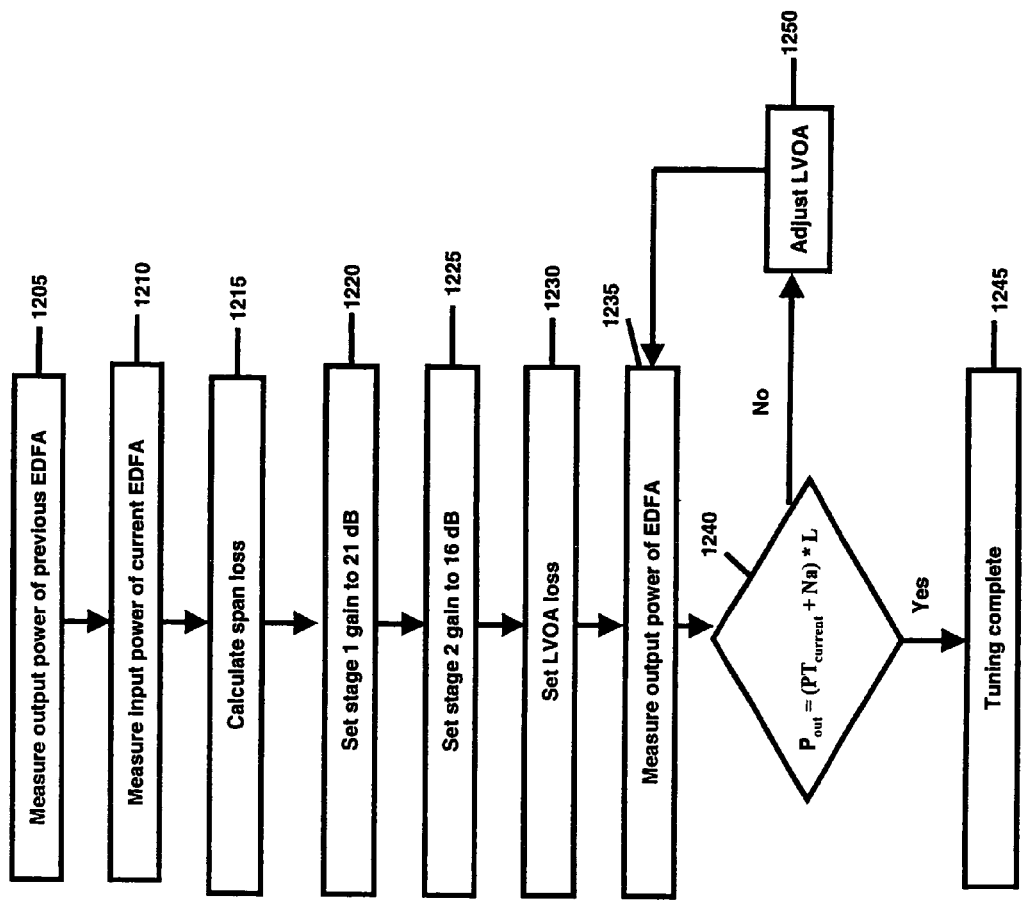
FIG. 12 is a flow chart of the preferred embodiment of the invention for initially turning an amplifier.

The steps for initially turning up an amplifier are shown in FIG. 12. The first step includes measuring the output power of previous amplifier 120, step 1205. Measuring the input power of current amplifier 120 occurs at step 1210. Calculating the span loss ($L_{span}$) by subtracting the input power of current amplifier 120 from the output power of previous amplifier 120 occurs at step 1215. In the preferred embodiment, a two stage amplifier is used. Stage one gain is set to 21 dB (the value most likely to produce a flat gain in stage one) at step 1220. Stage two gain is set to 16 dB (the value most likely to produce a flat gain of stage 2) at step 1225. Variable optical attenuator 795 loss is set to the stage one gain plus stage two gain minus the span loss minus the known loss of dispersion compensation module 715. The linear noise contribution parameter is calculated by the following equation:

$$Na = NF_{avg,linear} * 10^{-4.8} * BW(\text{nm}) \qquad \text{Equation 1}$$

Wherein, $NF_{avg,linear}$ is the average noise figure of an erbium doped fiber amplifier, and BW is the noise bandwidth of second stage erbium doped fiber amplifier 740. In the preferred embodiment, the average noise figure of an erbium doped fiber amplifier is approximately 3.5 and the noise bandwidth is approximately 64 nm.

Next, the output power of second stage erbium doped fiber amplifier 740 is measured, step 1235. Then, if the output power of second stage erbium doped fiber amplifier 740 is approximately equal to the input power of first stage erbium doped fiber amplifier 725 plus the linear noise contribution parameter times the span loss, step 1240, tuning is complete, step 1245.

The linear noise contribution parameter is calculated by Equation 1. If the output power of second stage erbium doped fiber amplifier 740 is not approximately equal to the input power of first stage erbium doped fiber amplifier 725 plus the linear noise contribution parameter times the span loss, step 1240, then, variable optical attenuator 795 is adjusted by the calculated output power out of second stage erbium doped fiber amplifier 740 divided by the measured output power of second stage erbium doped fiber amplifier 740, step 1250 and the output power of second stage erbium doped fiber amplifier 740 is again measured.

DGE and Associated Variable Optical Attenuator Tuning

Figure 13:
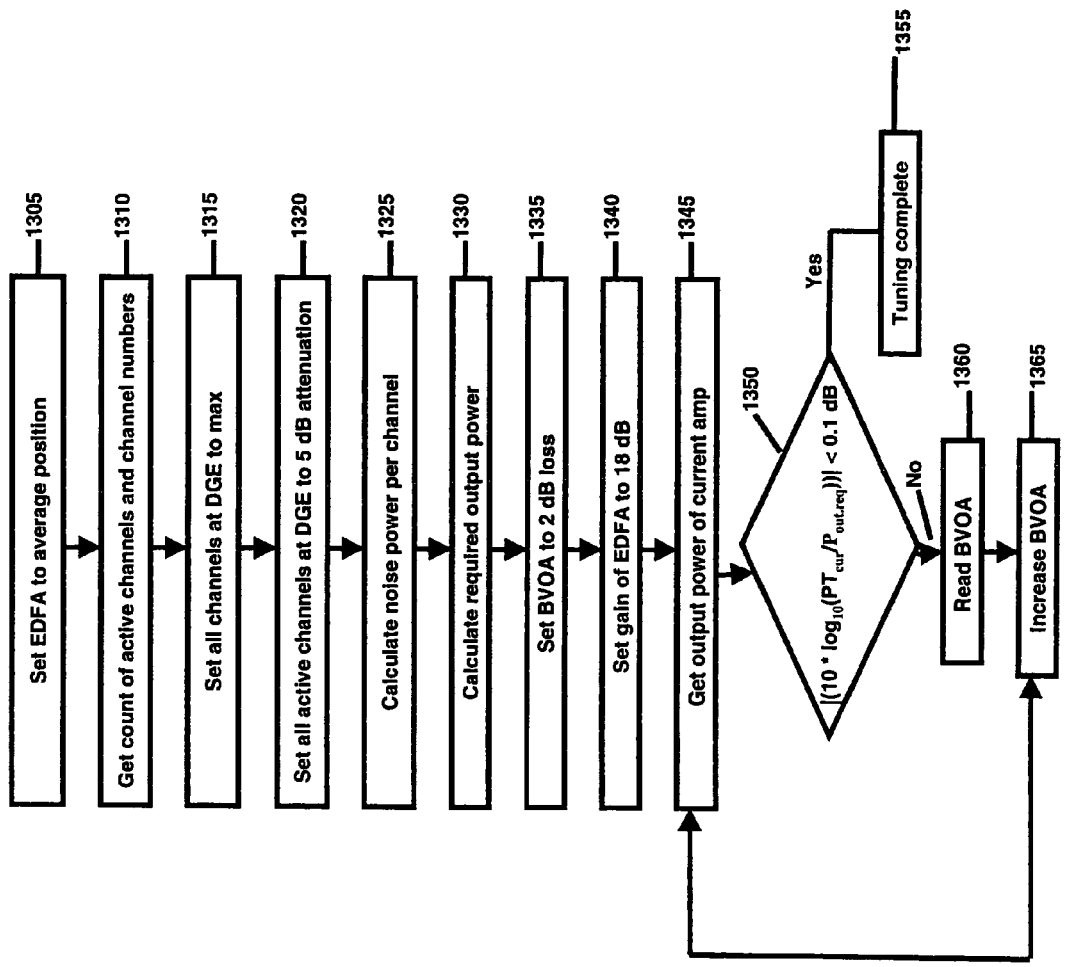
FIG. 13 is a flow chart of the preferred embodiment of the invention for tuning of a dynamic gain equalizer and booster amplifier turn-up.

Regarding the tuning of dynamic gain equalizer 720, as well as third stage erbium doped fiber amplifier 745 and associated variable optical attenuator 795 and assuming that the noise in the inactive channels is suppressed by DGE 720, the gain of third stage erbium doped fiber amplifier 745 is adjusted by variable optical attenuator 795 such that third stage erbium doped fiber amplifier 745 output power is comprised of the signal power of inactive channels plus the accumulated noise of these channels plus the noise of the erbium doped fiber amplifier 745. As shown in FIG. 13, second stage erbium doped fiber amplifier 740 is set to an average or default position, step 1305. Then a count of active channels and the power wavelength and other values for each channel is acquired from the topology table stored in memory 410 of management card 110, step 1310. Next, all inactive channels at DGE 720 are set to maximum attenuation, step 1315 and all active channels at DGE 720 are set to 5 dB attenuation, step 1320. The noise power per channel is calculated by the following equation:

$$P_{noise} = NF_{EDFA.avg} * 10(G_{EDFA.avg}/10) * BW_{filter}(\text{nm}) \\ * 10^{-4.8} \text{ mW} \qquad \text{Equation 2}$$

wherein $P_{noise}$ is the noise power per channel $NF_{EDFA.avg}$ is the average noise figure of an erbium doped fiber amplifier 740, $G_{EDFA.avg}$ is the average gain of erbium doped fiber amplifier 740, $BW_{filter}$ is the channel bandwidth of DGE 720, step 1325. Typical values for the average noise figure of second stage erbium doped fiber amplifier 740 is approximately 3.5 to 5.4. The average gain is approximately 24 dB, the channel bandwidth of DGE 720 is approximately 0.6-0.64 nm and the noise power per channel is approximately 8.36-13.8 µW.

The required output power is calculated by the following equation:

$$P_{EDFA.out.req} = N_{act} * (P_{sig} + P_{noise} * n_{EDFA}) + n_a * 10^{18/10} \qquad \text{Equation 3}$$

wherein $P_{EDFA.out.req}$ is required output power, $N_{act}$ is the number of active channels, $P_{sig}$ is the noise power per signal, $P_{noise}$ is the noise power per channel, #$n_{EDFA}$ is the number of erbium doped fiber amplifiers 740 in segment 575 and $N_a$ is linear noise contribution calculated by Equation 3, step 1330. The noise power per signal is approximately $10^{4/10}$ mW.

Variable optical attenuator 795 is set to 2 dB, step 1335. The gain of third stage erbium doped fiber amplifier 745 is set to 18 dB, step 1340, and the output power of the third stage erbium doped fiber amplifier 745 is measured, step 1345. Step 1350 shows the tuning of the DGE 720 is finished if:

$$|(10 * \log_{10}(PT_{cur}/P_{out.req}))| < 0.1 \text{ dB} \qquad \text{Equation 4}$$

If the tuning of the DGE 720 is not finished, then the value of variable optical attenuator 795 is read, step 1360 and adjusted by 10 times the log of the output power of third stage erbium doped fiber amplifier 745 divided by the calculated required output power, step 1365. Then the output power of third stage erbium doped fiber amplifier 745 is read again, step 1345. If Equation 4 is true, step 1350, then tuning of the DGE 720 is finished, step 1355; if not, then the value of variable optical attenuator 795 is adjusted as above and the process is repeated.

Tuning Transmitter Variable Optical Attenuator

Figure 14:
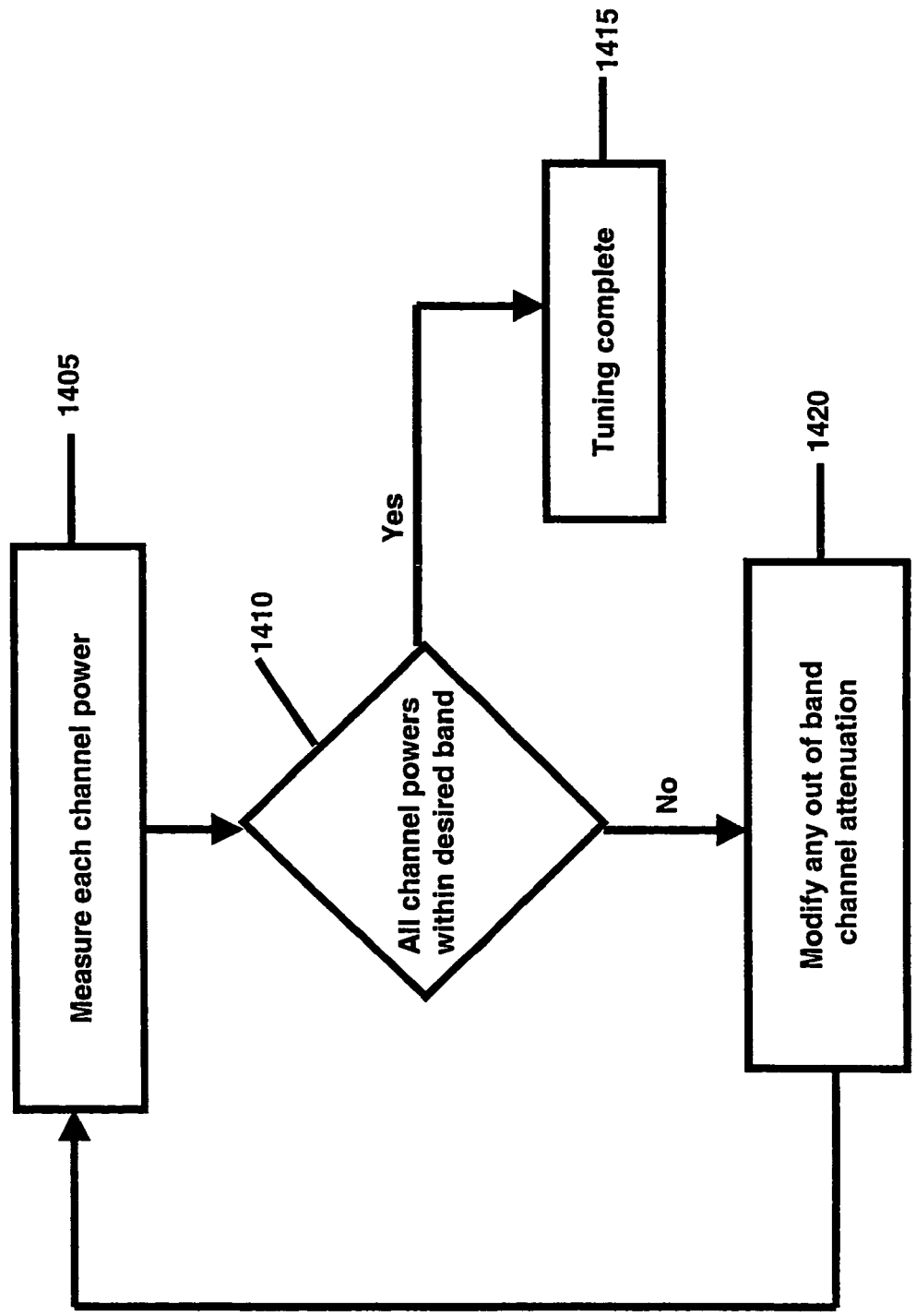
FIG. 14 is a flow chart of the preferred embodiment of the invention for tuning of a transmit variable optical attenuator.
Figure 15:
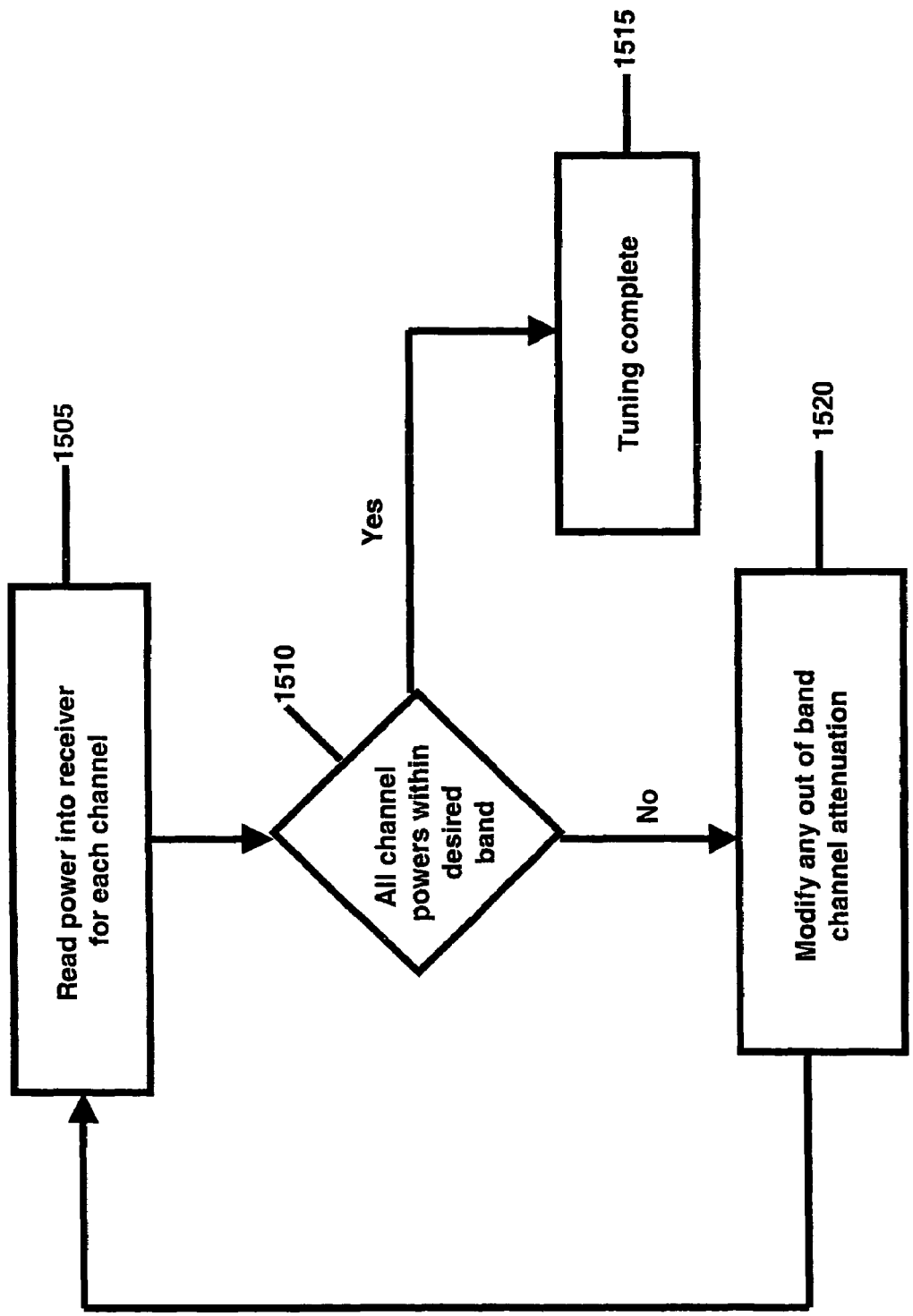
FIG. 15 is a flow chart of the preferred embodiment of the invention for tuning of a receive variable optical attenuator.

The procedure for tuning transmitter variable optical attenuator located on the multiplexer-demultiplexer card is shown in FIG. 14. The required power output for transmitter variable optical attenuator is determined based on channel space and active channels in the system. Channel spacing is either equal to or over 100 Ghz or below 100 Ghz. When management card 110 determines what the shelf type is during topology discovery, it also determines what the channel spacing is based on number of channels the shelf is capable of handling. For example a shelf that can handle up to 40 channels would have channel spacing either equal to or over 100 Ghz. A shelf that can handle over 40 channels will have channel spacing less then 100 Ghz. When the spacing is 100 Ghz or over, and there is one to 4 active channels, the target per channel power is 5.2 dB. If there are 5 or more active channels the target per channel power is 4.2 dB. When the channel spacing is less than 100 Ghz, and there is 1 active channel, the target per channel power is 4.2 dB per channel, if there are 2 to 4 active channels, the target per channel power is 3.2 dB per channel, if there are 5 to 8 active channels, the target per channel power is 2.2 dB per channel, if there are 9 to 80 active channels, the target per channel power is 1.2 dB per channel. Each of the power values is for a specific case and fiber type as found in the preferred embodiment. Other cases and fiber types will exhibit different power values. For each channel, the actual channel power is read at the output of the erbium doped fiber amplifier, step 1405. A delta is calculated to ensure each channel is within a desired band of 0.25 dB or below, step 1410. The delta is calculated by subtracting the actual power from the target power. If the calculated delta is less than or equal to 0.25 dB then nothing is done and the transmitter variable optical attenuator is tuned, step 1415. If the calculated delta for a channel is greater than 0.25 dB then the transmitter variable optical attenuator for that channel is adjusted by 0.25 dB, step 1420. If there is too much power, then the transmitter variable optical attenuator setting is raised by 0.25 dB and the process is repeated. If there is too little power, then the transmitter variable optical attenuator setting is lowered by 0.25 dB and the process is repeated Tuning Receiver Variable Optical Attenuator The procedure for tuning receiver variable optical attenuator located on the multiplexer-demultiplexer card is shown in FIG. 15. It includes reading the current optical power into receiver variable optical attenuator for each channel, step 1505. The current optical power is calculated by the receiving multiplexer demultiplexer card using the gain and power output of an autogain control amplifier and the current power/optical power calibration data stored on the card. The process of calculating the current optical power into receiver variable optical attenuator is known in the art. If all channel powers are within the desired band, step 1510, then tuning is completed and receiver variable optical attenuator is properly tuned, step 1515. The limits of the desired band are −9+/−2 dB and the preferred band is −5 dB. If the channel power is not within the desired band, then the attenuation is modified by setting the variable optical attenuator to the old value plus actual output power minus the required output power, step 1520. Then all channel powers are read again, step 1505. If any channel power is outside the desired band, step 1510, the process is repeated.

Erbium Doped Fiber Amplifier Tuning

Figure 16:
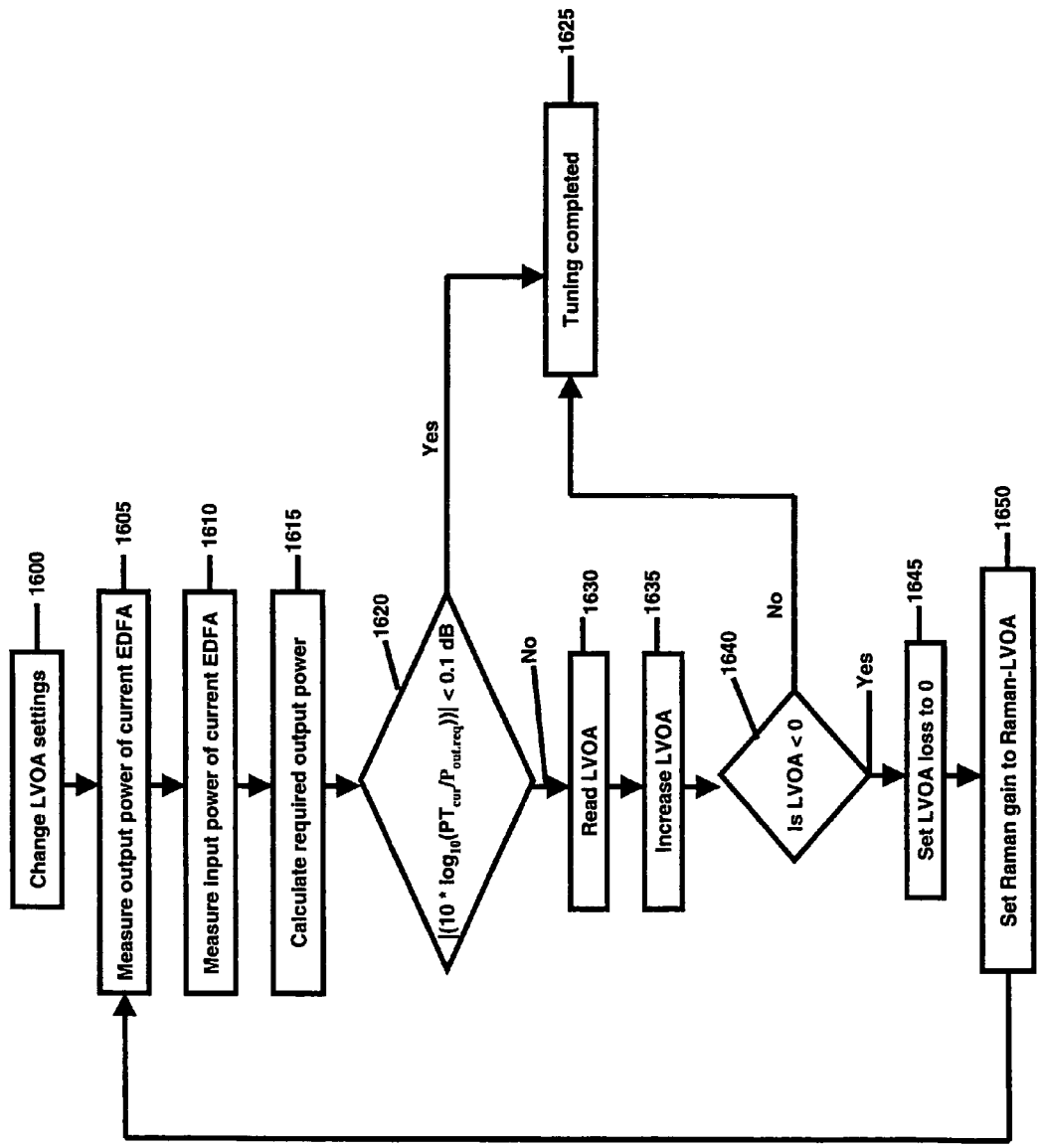
FIG. 16 is a flow chart of the preferred embodiment of the invention for tuning an amplifier.

FIG. 16 shows the procedure for tuning an amplifier such as erbium doped fiber amplifier 725 in a previously tuned system. To begin, variable optical attenuator 795 settings are changed such that the output power of the present erbium doped fiber amplifier 725 equals the input power into the previous span plus an amount that accounts for additional noise, step 1600. If Raman gain is present and necessary it is used. Tuning erbium doped fiber amplifier 725 includes measuring the output power of erbium doped fiber amplifier 725, step 1605, measuring the input power of current erbium doped fiber amplifier 725, step 1610, and calculating the required output power of erbium doped fiber amplifier 725, step 1615. The required output power of erbium doped fiber amplifier 725 is calculated by multiplying the input power of erbium doped fiber amplifier 725 plus the linear noise contribution parameter by the span loss. The linear noise contribution parameter is calculated by Equation 1. Step 1620 and 1625 show tuning is complete if:

$$|(10*\log_{10}(PT_{cur}/P_{out.req}))|<0.1 \text{ dB} \qquad \text{Equation 5}$$

Wherein $PT_{cur}$ is the measured output power of erbium doped fiber amplifier 725 and $P_{out.req}$ is the calculated required output of erbium doped fiber amplifier 725.

However, if Equation 5 is not true, then the current value of variable optical attenuator 795 is read, step 1630. Next, step 1635 sets a new variable optical attenuator setting calculated by:

$$10*\log_{10}(PD4_{cur}/P_{out.req}) \qquad \text{Equation 6}$$

If the new variable optical attenuator setting is not less than zero, step 1640, then the tuning of erbium doped fiber amplifier 725 is completed, step 1625. If the new variable optical attenuator setting would be less than zero, step 1640, the variable optical attenuator loss is set to zero, step 1645, and the Raman gain is set to the current Raman gain minus the new variable optical attenuator setting after being adjusted, step 1650. Again, the output power of erbium doped fiber amplifier 725 and the input power of previous erbium doped fiber amplifier 725 are measured, steps 1605 and 1610, and the required output power of erbium doped fiber amplifier 725 is calculated, step 1615. If Equation 5 is true, step 1620, then the tuning of erbium doped fiber amplifier 725 is completed, step 1625, otherwise the process is repeated.

Amplifier Tuning Using OSA Readings

Figure 17:
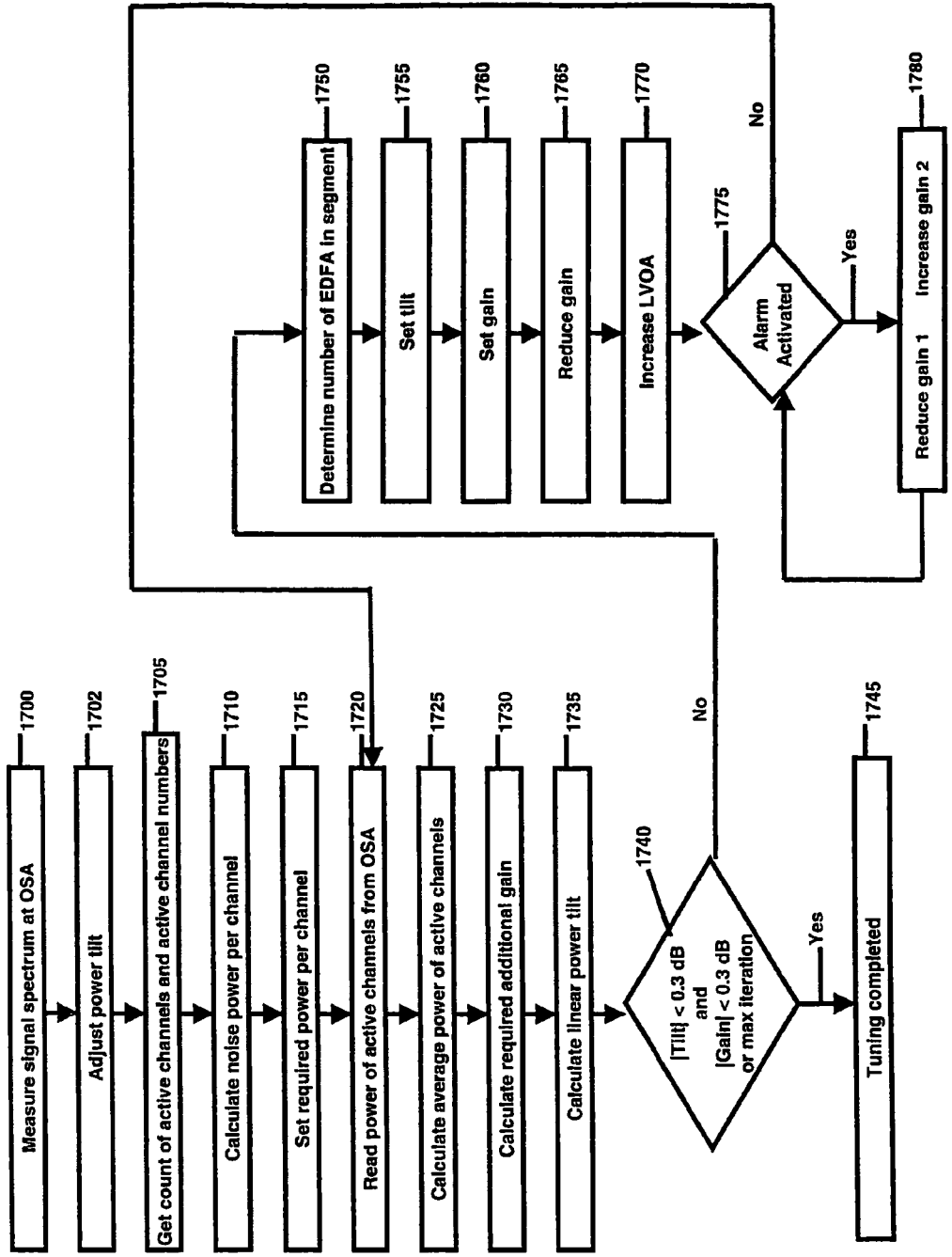
FIG. 17 is a flow chart of the preferred embodiment of the invention for tuning an amplifier using optical spectrum analyzer readings.

FIG. 17 shows a flow chart for optical amplifier 120 tuning using OSA readings. If optical spectrum analyzer 710 is present on a station, the preferred method for tuning amplifier 120 includes using OSA readings. Using OSA readings, tilt can be more accurately accounted for and a more optimum tuning of amplifier 120 can be achieved. To tune any amplifier gains utilizing optical spectrum analyzer 710 readings, the signal spectrum is measured at optical spectrum analyzer 710, step 1700. The power tilt is then adjusted by changing the gain and transmitter variable optical attenuator settings in all previous amplifiers 120 and the tuning segment 575, step 1702. Then a count of active channels and the relevant values for each channel is acquired from the topology tree stored in memory 410 of management card 110, step 1705. The noise power per channel is calculated using Equation 2, step 1710. In step 1715, the required power per channel is calculated using the following equation:

$$P_{required}=P_{sig}+P_{noise}*(\#n_{EDFA}) \qquad \text{Equation 7}$$

The power of active channels is read from optical spectrum analyzer 710 where the bandwith is approximately 0.8 times the channel spacing, step 1720. Next, the average power of active channels is calculated by taking the average of the logarithmic power values in dB, step 1725. In step 1730, the required additional gain is calculated by the following equation:

$$\text{additional gain}=10*\log_{10}(P_{required}/P_{ave}) \qquad \text{Equation 8}$$

Wherein $P_{ave}$ is the calculated average power per channels. Next, in step 1735, the linear power tilt of active channels is calculated using the following equation:

$$\text{tilt} = \frac{N_{pop} \sum\limits_{pop\text{-}channels} (n_{ch} \times P_{ch}) - \sum\limits_{pop\text{-}channels} n_{ch} \times \sum\limits_{pop\text{-}channels} P_{ch}}{N_{pop} \sum\limits_{pop\text{-}channels} (n_{ch}^2) - \left(\sum\limits_{pop\text{-}channels} n_{ch}\right)^2} \times N_{systems} \quad \text{Equation 9}$$

where $N_{pop}$ is the number (count) of populated channels, $n_{ch}$ is a channel number (1-40 or 1-80), $P_{ch}$ is the signal power (in dBm) measured in channel $n_{ch}$, and $N_{system}$ is the number (count) of possible channels in the system (40 or 80). If the absolute value of the calculated tilt is less than 0.3 dB and if the absolute value of the required additional gain is less than 0.3 dB or if the maximum iteration count has been reached, step 1740, then tuning of amplifier 120 is completed and optical amplifier 120 is properly tuned, step 1745. Preferably the maximum iteration count is 500 but may be between 50-5000. If in step 1740, the absolute value of the calculated tilt is not less than 0.3 dB or the calculated value of the required additional gain is less than 0.3 dB and the maximum iteration count has not been reached, then the number of amplifiers 120 in segment 575 is determined, step 1750. A new tilt is calculated by dividing the old tilt by the number of amplifiers 120 in current segment 575, step 1755. A new additional gain is calculated by dividing the old additional gain by the number of amplifiers 120 in current segment 575, step 1760. Next, for each amplifier 120 in the tuning segment, the first gain is reduced by the newly calculated tilt, step 1765. The variable optical attenuator 590 is adjusted by the newly calculated tilt minus the newly calculated additional gain, step 1770. To ensure the gain does not go over a pre-set limit such a gain alarm may be used, step 1775. The range of a pre-set limit is dependent on the type of amplifier used. For example, the gain alarm is triggered at 28 dB for a Corning pure gain 5500 EDFA with a gain range of 23-28 dB. The gain alarm would be monitored by management card 110. If the alarm is set and triggered, the first gain is reduced by 0.5 dB and the second gain is increased by 0.5 dB until the alarm is no longer set, step 1780. Then once the alarm is no longer triggered, the power of active channels from optical spectrum analyzer 710 is re-read, step 1720, and the process is repeated.

Full Chain Tuning

Figure 19:
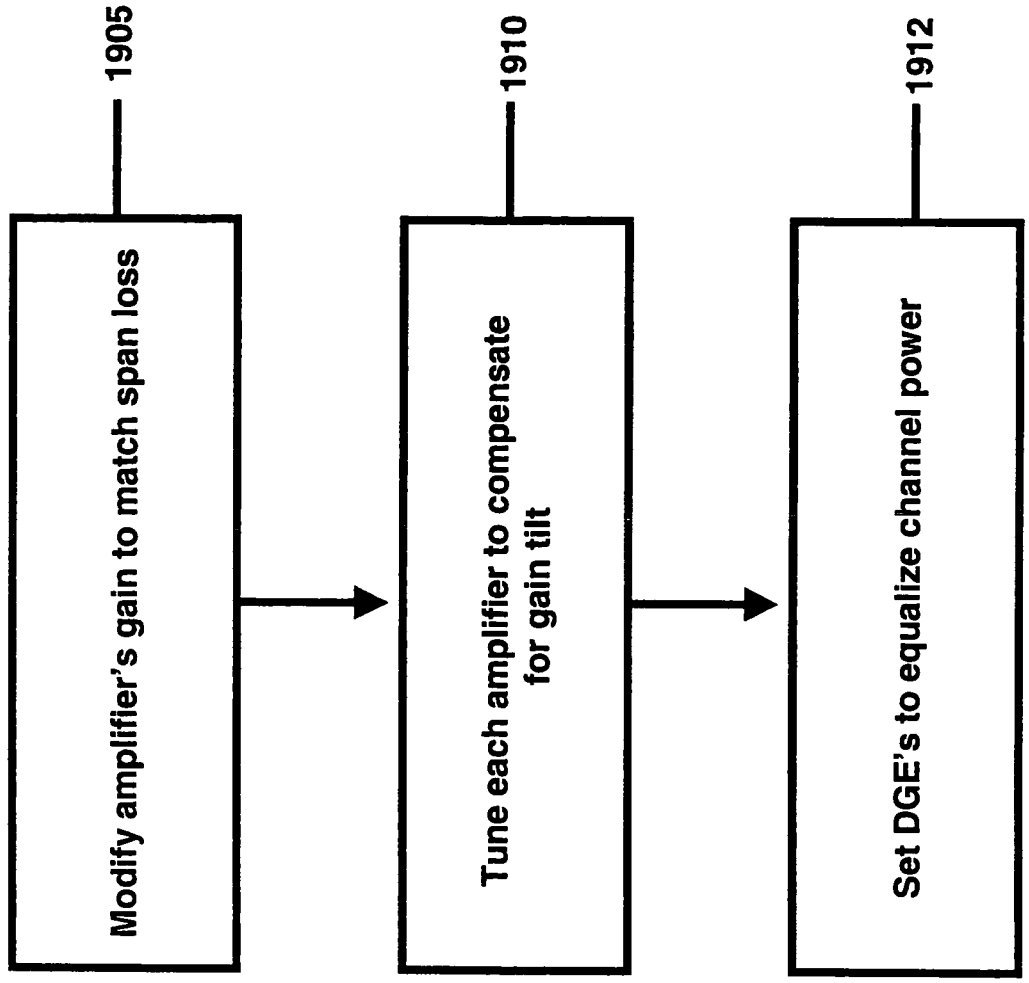
FIG. 19 is a flow chart of the preferred embodiment of the invention for full chain tuning.

FIG. 19 is a flow chart showing the tuning of a full segment. Tuning of a full segment chain consists of several phases. First, each amplifier's 120 gain is modified to match span loss using the below described procedure for tuning of dynamic gain equalizer 720 and associated variable optical attenuator, step 1905. Next each amplifier 120 is tuned to compensate for gain tilt using the procedure for amplifier tuning using OSA readings, step 1910. Finally, any dynamic gain equalizer 720 in the segment is set in order to equalize channel power using the procedure for dynamic gain equalizer tuning, step 1912.

The process is repeated until signals are within an acceptable range or a hard limit of iterations is reached. In the preferred embodiment, the acceptable ranges are 0-1024. In the preferred embodiment, the hard limit of iterations is 256 but can be anywhere in the range of 50-5000. In addition, after each of these steps the final optical spectrum analyzer 710 reading from the previous step is reused in the next step in order to reduce unnecessary switching and time use.

DGE Tuning With OSA Readings

Figure 18:
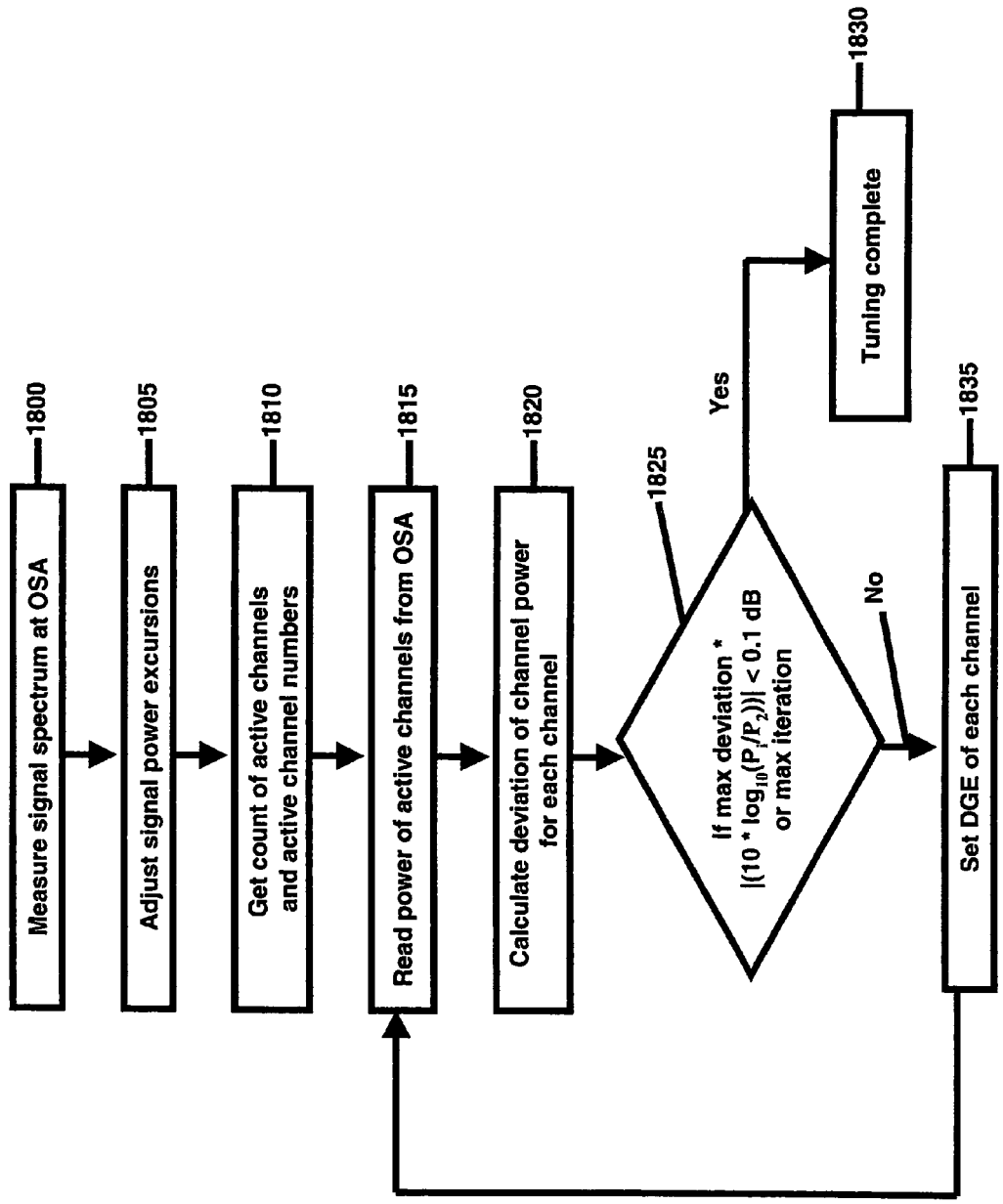
FIG. 18 is a flow chart of the preferred embodiment of the invention for tuning a dynamic gain equalizer.

FIG. 18 is a flow chart showing dynamic gain equalizer 720 tuning using optical spectrum analyzer 710 readings. If optical spectrum analyzer 710 is present on a station, the preferred method for tuning dynamic gain equalizer 720 includes using OSA readings. Using OSA readings, tilt can be more accurately accounted for and a more optimum tuning of dynamic gain equalizer 720 can be achieved.

To tune dynamic gain equalizer 720 utilizing optical spectrum analyzer 710 readings, the signal spectrum is measured at optical spectrum analyzer 710, step 1800. Then signal channel power excursions are adjusted via the channel by channel dynamic gain equalizer 720, step 1805. A count of active channels and the required values for each channel is acquired from the topology tree stored in memory 410 of management card 110, step 1810. Then, the power of the active channels are read from optical spectrum analyzer 710 preferably at a bandwidth of approximately 0.8 times the channel spacing, step 1815. Next, for each active channel, the required channel power is calculated by using Equation 7, step 1820. Step 1825 and 1830 show tuning of dynamic gain equalizer 720 is completed if the maximum iteration count has been reached or if following equation is true:

$$|(10*\log_{10}(P_{measured}/P_{required}))|<0.1 \text{ dB} \quad \text{Equation 10}$$

Wherein $P_{measured}$ is the measured channel power and $P_{required}$ is the calculated required channel power. Preferably the maximum iteration count is 500 but may be between 50-5000. If the maximum iteration count has not been reached or if Equation 9 is not true then, for each active channel, is dynamic gain equalizer 720 attenuation is set to the measured power of that channel n divided by the power required for that channel n, step 1835. Then, the power of the active channels is read from optical spectrum analyzer 710, step 1815, and the process is repeated. Setting the dynamic gain equalizer 720 attenuation may require feedback depending on the dynamic gain equalizer 720 repeatability.

Fiber Tuning

The effects of chromatic dispersion, ripple attenuation, fiber aging, fiber damage or failure, as well as other fiber related effects on the overall optimization of the system are compensated for by equalizing the fiber related effect. The gain ripple of various stages of the erbium doped fiber amplifier and gain tilt from Stimulated Raman Scattering (SRS) during fiber propagation and polarization dependent loss (PDL) lead to variations in the signal power over the spectrum. Without equalization, these variations accumulate and lead to a reduction in the optical signal-to-noise ratio (OSNR) as well as to increased non-linear distortions for some channels.

The power is equalized to yield uniform signal power over the transmission spectrum at the output of every $N^{th}$ optical amplifier 120. This is monitored via a channel monitoring system such as optical spectrum analyzer 710 with a coarse resolution bandwidth about 0.7 times the channel spacing. The number of spans between equalization sites, or "equalization period" N, should be an odd number.

Figure 20:
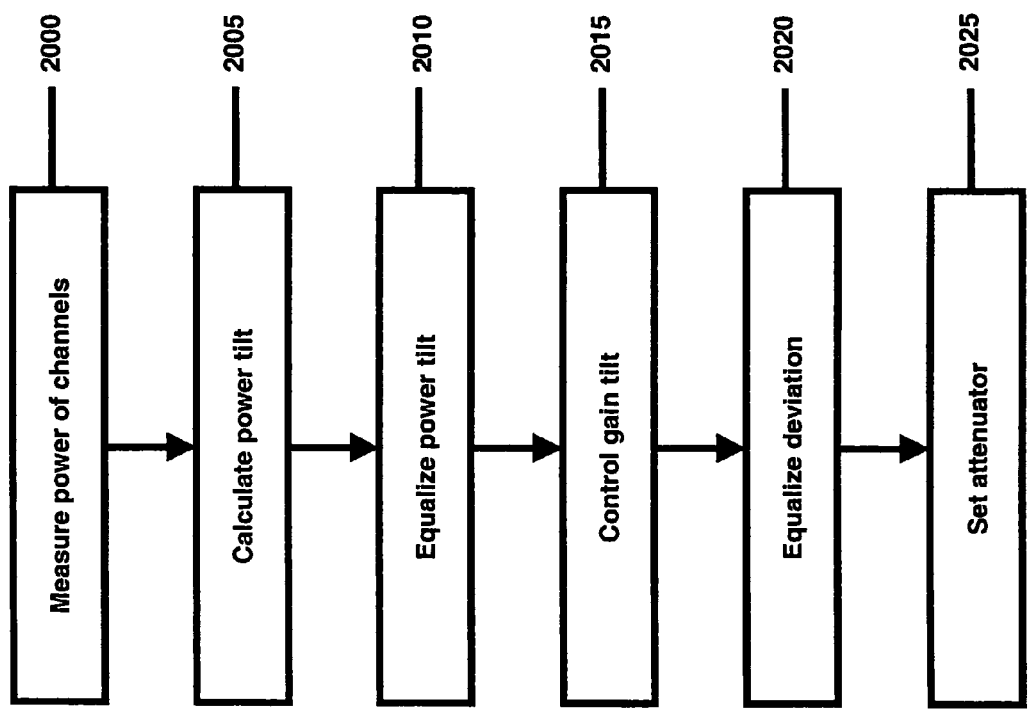
FIG. 20 is a flow chart of the preferred embodiment of the invention for tuning an optical fiber.

Referring to FIG. 20, in a first step, the power of each populated channel is measured on optical spectrum analyzer 710, step 2000. The power tilt is then calculated from these power values from Equation 9, step 2005.

Once the channel power levels are known, the next step is to equalize the linear power tilt by controlling the gain-tilt at the N amplifier 120 sites preceding optical spectrum analyzer 710, step 2010. The gain tilt in each of these amplifiers 120 needs to be adjusted by a uniform amount to yield a flat power spectrum at optical spectrum analyzer 710. Instructions are then sent to each amplifier 120 to control the gain tilt independently from each amplifier 120 internal gain-control algorithm, step 2015. The internal gain-control algorithm of an amplifier is well known.

The next step is to equalize the deviation in power in each channel from the average per-channel power using a dynamic equalizing filter (DEF) such as receiver variable optical attenuator 795, dynamic gain equalizer 720 or transmitter variable optical attenuator, step 2020. The average power per signal channel is measured at optical spectrum analyzer 710. For each channel, the deviation from this average power is calculated. Finally, the attenuation in the DEF for each channel is set to the calculated deviation amount to yield a uniform power at optical spectrum analyzer 710, step 2025. The maximum required power attenuation value depends on the amount of amplifier gain ripple and PDL in each span and on the number of spans between equalization sites.

The attenuation values are described relative to an average attenuation level. To equalize the channel powers, some channels require additional attenuation, while other channels require "negative attenuation" relative to this average attenuation level. To avoid requiring active elements (gain elements) in the DEF, the average attenuation in the DEF needs to be at least as large as the maximum required "negative attenuation" for the weakest channel. The required average attenuation level contributes to the fixed insertion loss specification of the DEF device.

Channel Turn-Up

Figure 11:
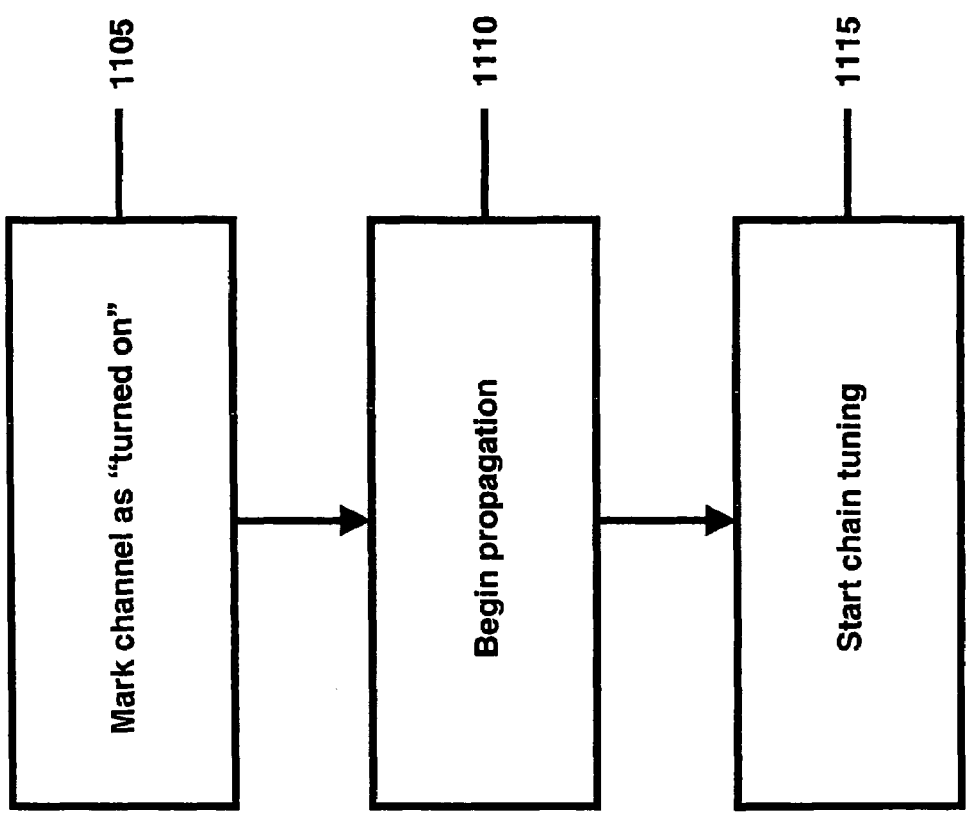
FIG. 11 is a flow chart of the preferred embodiment of the invention for automated channel turn up.

FIG. 11 is a flow chart showing the turn-up of a channel across the entire transmission chain. The turn-up of a channel across the entire transmission chain can be automatically done by the autotuning process with little or no required operator input. Each direction, A-Z and Z-A, is handled independently and the channels will be turned up and down one at a time. A change made during channel turn up can exceed the maximum change rate for operational system changes since the output never actually reaches the receiver and, therefore, has a lesser effect on neighboring channels.

To begin, topology discovery module 800 marks the channel as turned on in the topology tree, step 1105. Then source of the signal or transceiver is turned on and the signal is allowed to begin propagation in system 500, step 1110. The transceiver may already be on and could be outside system 500. Chain tuning is started and the full chain tuning process described in FIG. 19 is followed, step 1115, with the following additions. Generally, on variable optical attenuator 795 for the new channel, the initial attenuation is set to equal average attenuation of the neighbor's channels. For neighbors lacking a variable optical attenuator 795, a value, 5 dB is used. On transmitter variable optical attenuators for the new channel, an initial attenuation is set to equal the average attenuation of the channel's neighbors. For neighbors lacking a variable optical attenuation, a default value of 10 dB is used. On receiver variable optical attenuator for the new channel, an initial attenuation is set equal to the average attenuation of the channel's neighbors.

Channel Turn Down

As shown in FIG. 21, the channel turn off procedure involves turning off the channels receiver 2100 marking the channels as down in the topology tree by topology discovery module 2100 and going through the full chain tuning process 2110. Attenuation of the off channel at each segment is done starting with transmitter variable optical attenuator.

The sub-routine can also be modified. Settings will be equalized to power during the next autotuning cycle. It may be desirable to remove tilt from variable optical attenuator 795 and adjust it from the amplifiers to maintain an acceptable range.

Token Based Priority Scheme

In order to successfully tune an entire transmission chain, each segment 575 must be tuned by itself in the order of source to destination along the chain. To accomplish this a designated token passing scheme that is fault tolerant, but which allows only one segment 575 to be tuned at a time and provides for tuning segments 575 in the correct order is used.

Figure 9:
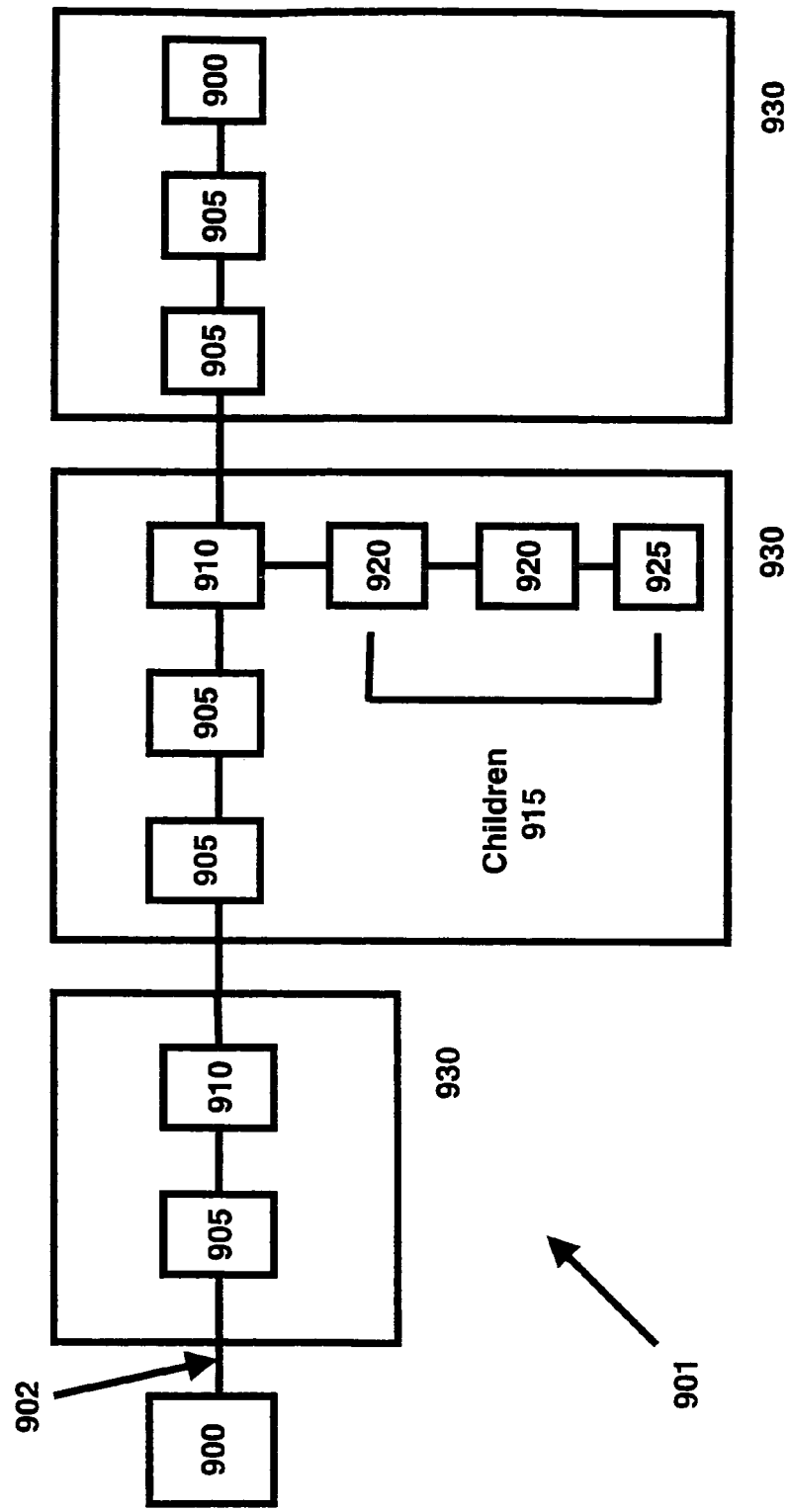
FIG. 9 is a graphical depiction of a network arrangement of the invention including originator and OTS.

FIG. 9 is a simplified block diagram of transmission system 901 showing various different segments with different component identities as defined by the software to facilitate a token passing scheme. Transmission system 901 is similar to system 510 and certain elements are shown or not shown for reference and illustrative clarity. Originator 900 is an end terminal 102 and master station 615. Originator 900 is operationally connected to one or more slave stations 905 via fiber 902. The one or more slave stations 905 are operationally connected to master station 910. Master station 910 is the same as master station 615, but it is not an originator 900 because it is not an end terminal 102. Master station 910 may have children 915. Children 915 are one or more slave stations 920 or master stations in various networking configurations that branch off from transmission system 901. Note that even though master station 925 is a terminal station, it is not an end terminal 102 of transmission system 901 and therefore not an originator 900. Segment 930 is defined in the same way as segment 575.

The topology of transmission system 901 is created by topology discovery module 800 (FIG. 8) and is stored in memory 410 of management card 110 of each station. Through the process described earlier, topology discovery module 800 determines what stations are originators 900, master stations 910, slave stations 905 and children 915.

In order to conduct tuning and topology discovery in an orderly fashion, the software adopts "token passing". Referring to FIG. 9, originator 900 generates a tuning token control (TCT) or token. The token, when held by master station 910, represents the ability of that station to tune its segment 930. Tuning begins at the farthest master station upstream. When master station 910 is finished tuning its segment 930, the token is passed to the next master station 910 downstream. There is one token per transmission fiber, that is, per chain/direction combination, and the token is passed only among the master stations 910. Tokens can only originate at an originator 900 that is a master station 910. The master station 910 that has the token sends a token control update to the token originator at the beginning of each tuning cycle. When master station 910 is done tuning its segment 575, master station 910 sends a token control offer to the next master station 910 downstream in the chain of segments 575. If the token control offer is accepted, then the token is passed to the next master station 910. If the token is not accepted within a time out period, the token is offered to the next downstream master station 910.

The token is spontaneously regenerated at the start of the chain by originator 900 if the token is somehow "lost". During typical operation, as the token is passed from master station 910 to master station 910, the station that transmits the token sends a signal to the originator 900 as to where the token is being sent. Once a master station receives a token, it sends a signal to the master station that created the token has been received. If this signal is not received, the token is "lost". To find the token, a token control update signal is generated by originator 900. It queries each master station 910 to determine if any master station 910 still has the last token transmitted. If no station has the last token transmitted, then originator 900 generates a new token.

If the tuning is triggered by control sequence 815 while a segment 575 is currently being tuned, then originator 900 can start tuning over at the beginning. To do this, originator 900 issues a token control return request to any tokens in transmission system 901. After all the found tokens are returned, originator 900 transmits a new token.

Master station 910 may create a copy token if master station 910 has children 915. If a token is transmitted to master station 910 and master station 910 has children 915, master station 910 will make a copy of the received token. One token stays at master station 910 while the copy token is transmitted to children 915. Before master station 910 with children 915 transmits the token to the next master station 910, master station 910 with children 915 will wait until it has received all the copy tokens it sent out. It is possible master station 910 could have more than one chain or group of children 915 and therefore master station 910 may transmit out more than one copy token. However, only one copy token is transmitted down a single chain of children 915. The copy token that is transmitted down a chain contains a unique identifier to distinguish it from the original token and from other copy tokens.

When a master station 910 sends the token to the next master station 910, the master station 910 that has the token sends a token control update to originator 900 that originated the token. The token control update contains information regarding the tuning process such as whether or not the tuning was successful and where the token is being sent. All stations are identified within the token by their lookback IP address. If no token control updates have been received by the originator in a specified amount of time, then a token return request is sent to each station in the chain requesting a token control update. The specified amount of time or cycles is preferably short enough to prevent the system from becoming stale and long enough to allow for efficient token recovery. In the preferred embodiment, this time is two to thirty minutes, with a preferred time of five minutes. Each time the tuning cycle starts and before reading the first optical spectrum analyzer 710, a token control update message is sent to the token originator. By combing topology information with an awareness of the current token location, the system can respond to token loss and restart the tuning process.

Tuning of segment 575 may act differently depending on various conditions. If a device does not work, then tuning attempts to optimize the signal without changing the damaged device's settings. If a device is manually set, the settings are treated as if the device was damaged and the device's settings are not changed. If an entire slave station 905 is off, then slave station 905 is treated as if all devices on that station have been manually set. If master station 910 is turned off then master station 910 does not tune the segment. If an optimize flag has been set by the user within the token, then tuning will attempt to optimize the signal by changing parameters, even if system measurements are currently within the acceptable range. If an override manual flag is set, then master station 910 will autotune all devices, even if they have been manually set by the user. If an override on/off flag is set, then master station 910 will tune itself and all slave stations 905 in its segment 575, regardless of whether tuning has been turned off by the user.

The token may contain several pieces of information including, but not limited to, the token originator identifier, unique token ID, direction of travel of the station, previous, current and next master stations for the token, token copy identifier, optimize flag, override manual flag, or override on/off flag.

If a channel is split unto multiple parts, then multiple tokens will be generated at the start of each disconnected sub-chain. When the channel is restored, the tuning control process will have to remove the extra tokens. To do this, after master station 910 accepts the token, master station 910 checks the originator ID of the token against the topology table stored in memory 410 of management card 110. If the originator ID of the token does not match the ID of originator 900, a token originator return message is sent to the correct token originator and the token is then destroyed.

Switch Manager Process

The switch manager process is a separate process which handles all data to switched devices. Switched devices operate on one direction of traffic flow at a time. The switch manager allows for simultaneous requests for the attenuation of the device to be handled without generating conflicts or invalid data. In the preferred embodiment, the only switch device is optical spectrum analyzer 710, which is connected via a 4×1 switch to multiple points of the system. However, the system may contain multiple switched devices, including single devices with distributed switch setups. All access to the switched devices are managed through a switch manager.

The switch manager ensures that all data read from switched devices is from the switch position requested. This prevents multiple applications from simultaneously attempting to perform separate operations involving a switch. The communication mechanism is provided through the IPC layer, and messages are provided by the switch manager as a proxy for the DCA OSA card.

The switch manager keeps track of the current status of all optical switches. Then it takes the configuration request and the data request for any device it controls. Each request is queued until no other request is being processed. Then the switch is set to the appropriate position and the request is sent to the device. The switch manager waits the time required to execute the command or until a process is received if one is required, before processing further requests. If it is useful or necessary, the switch manager can optimize the queue to reduce switch cycles or to prefer higher priority request. Note that the switch manager actually prevents direct access to the switches or switch devices. All applications which need these devices will be programmed to work through the switch manager.

Script Controlled Tuning

Figure 10:
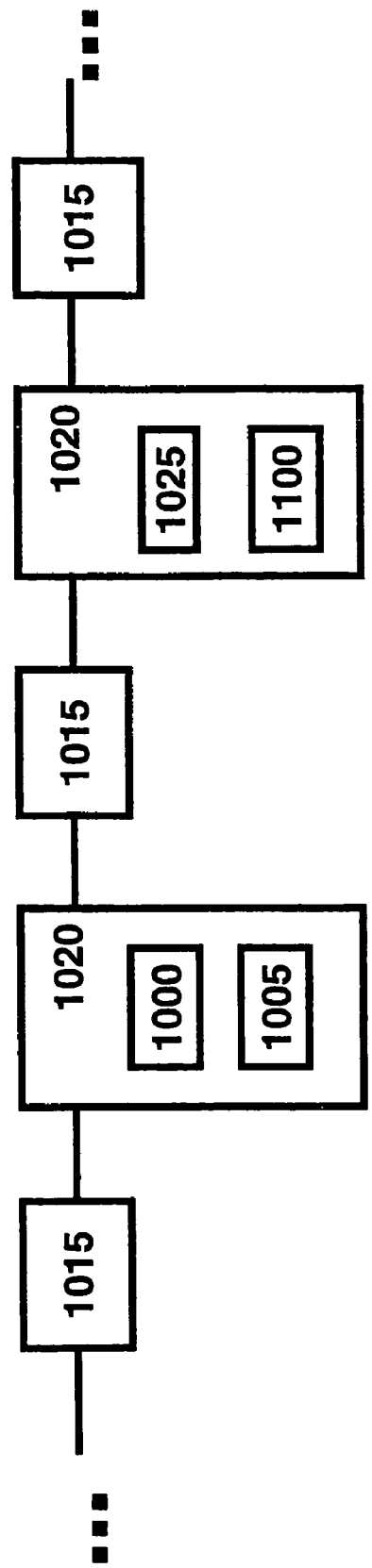
FIG. 10 is a graphical depiction of one embodiment of a network arrangement of the invention including director, script manager and station manager.

FIG. 10 shows a second embodiment of the invention. In place of a token-based scheme, tuning is controlled by a director 1000, script manager 1005, and station manager 1100. All these processes run on both master 1020 and slave 1015 stations. Each station has all the necessary software to perform all the above functions; therefore, any station in the system can be station manager 1000, script manager 1005, or station manager 1010. In the preferred embodiment, the station with optical spectrum analyzer 710 is a station manager 1010 because most of functions of station manager 1010 require OSA readings. The station manager 1010 could be a station other than one with optical spectrum analyzer 710, but that would require OSA readings over the system which would be relatively inefficient.

The choice as to which station becomes director 1000 is based upon shelf type and the serial number of the shelf. The assignment hierarchy for stations is master terminal shelf (MTS), optical add drop master shelf (OMT), and then other shelves. An MTS differs from an OMT in that an OMT has an optical add drop while an MTS does not have an optical add drop. A MTS is preferred over an OMT because there is a greater chance that an MTS is an end terminal and also because generally an MTS has a direct link to the most amplifiers 120. If there are MTS shelves available, the MTS shelf with the lowest serial number becomes director 1000. If an MTS shelf is not available, but there are OMT shelves available, the OMT shelf with the lowest serial number becomes director 1000. If an OMT shelf is not available, the system will pick the lowest serial number of all the shelves to be director 1000. By using this process, all the stations are independently able to determine what station or shelf becomes director 1000. If two stations decide they are director 1000, then a topology error report is generated.

The hierarchy of stations is determined during the topology discovery process 800, and when the topology changes. Once a station decides it is director 1000, the director software becomes active on that station. On all the other stations, the director software is inactive.

Director 1000 is also the interface to the user. The command line interface or user interface communicates to director 1000. To manually tune the system, a user issues the proper command from the command line to instruct director 1000 to run a tuning cycle. Director 1000 builds a script to tune the system. The script is based on topology, communicates the script to script manager 1005, which executes the script. The user can enter a command code on any station. If a command code is entered onto a station that is not director 1000, the director software for the station where the command code was entered sends the command code to director 1000. Then the director software on the station where the command was entered returns to an inactive state.

Director 1000 determines the topology of the system and tuning requirements of the system, generates a list of low level tuning functions, and determines the order in which the tuning functions are to be executed. The list of tuning functions is known as the "script". It contains the various tuning equations and algorithms previously described.

Station manager 1010's function is to accept the script from script manager 1005 and perform the instructions on the script. Station manager 1010 executes the instructions on the script one at a time. For example, the instructions in the script may be to pre-tune a long chain of slave stations 1015, similar to a configuration like segment 575. In another example, script manager 1005 communicates to station manager 1010 how and when to adjust gain functions on slave stations 1015. Script manager 1005 can also do parallel tuning by coordinating and executing the tuning functions which are not interdependent at the same time.

Although the invention has been described with reference to one or more preferred embodiments, this description is not to be construed in a limiting sense. There is modification of the disclosed embodiments, as well as alternative embodiments of this invention, which will be apparent to persons of ordinary skill in the art, and the invention shall be viewed as limited only by reference to the following claims.

The invention claimed is:

1. A computer-readable medium comprising instructions that, if executed by a computing device, cause the computing device to automatically tune an optical transport system having a plurality of modules for operating the system at a predetermined efficiency, the instructions comprising:

instructions for maintaining a topology tree based on an identified topology, the topology tree comprising node type information about a plurality of nodes in the optical transport system;

instructions for identifying key component information for proper optical transport system function;

instructions for determining an order for the plurality of nodes to be autotuned based on the topology tree and the key component information; and instructions for autotuning the optical transport system based on the order by passing a token to at least two of the plurality of nodes corresponding to the order, wherein the autotuning comprises bringing a circuit or an optical device into service.

2. The computer-readable medium of claim 1 wherein the plurality of modules comprise at least one of a topology discovery module, a provisioning module, an autotuning module, or a control sequence module.

3. The computer-readable medium of claim 2 wherein the plurality of modules are located in a management card.

4. The computer-readable medium of claim 2 wherein the plurality of modules are present in at least one optical fiber amplifier station.

5. The computer-readable medium of claim 2 wherein the control sequence module initiates a control sequence for the autotuning process.

6. The computer-readable medium of claim 2 wherein the topology discovery module comprises an autodiscovery module for identifying a fiber wavelength topology view of the optical transport system.

7. The computer-readable medium of claim 6 wherein the key component information includes status and configuration information and is provided by the autodiscovery module.

8. The computer-readable medium of claim 6 wherein the topology discovery module further operates to complete actions comprising at least one of controlling a discovery process, controlling builds, propagating a database, or maintaining the database.

9. The computer-readable medium of claim 8 wherein the database comprises a topology tree database stored in a memory of a management card.

10. The computer-readable medium of claim 9 wherein the topology tree database comprises information for autotuning by the provisioning module.

11. The computer-readable medium of claim 10 wherein the information for autotuning comprises at least one of node type or components on the node.

12. The computer-readable medium of claim 11 wherein the information for autotuning further comprises information not related to autotuning.

13. The computer-readable medium of claim 12 wherein the information not related to autotuning includes node name and software versions being used in various components of the node.

14. The computer-readable medium of claim 10 wherein the provisioning module is configured to examine the topology tree database information created by the topology discovery module.

15. The computer-readable medium of claim 14 wherein the provisioning module is further configured to conduct functions comprising at least one of validating channels, validating optical paths, testing components for working condition, or initiating the autotuning module.

16. The computer-readable medium of claim 8 wherein propagating the database is conducted based on open shortest path first propagating methods having logic to detect specific station changes.

17. The computer-readable medium of claim 8 wherein the topology discovery module propagates information relating to changes throughout a network.

18. The computer-readable medium of claim 2 wherein the provisioning module comprises logic to support provisioning of at least one of a logical circuit or an optical channel for autotuning.

19. The computer-readable medium of claim 18 wherein the logic supports provisioning from an endpoint.

20. The computer-readable medium of claim 2 wherein the provisioning module includes logic to turn up a circuit.

21. The computer-readable medium of claim 20 wherein turning up the circuit comprises bringing the circuit into service.

22. The computer-readable medium of claim 2 wherein the provisioning module includes logic for turning down a circuit.

23. The computer-readable medium of claim 22 wherein turning down the circuit comprises removing the circuit from service.

24. The computer-readable medium of claim 22 wherein the logic is configured to determine a primary service state and a secondary service state.

25. The computer-readable medium of claim 24 wherein the primary service state comprises at least one of in service or out of service.

26. The computer-readable medium of claim 25 wherein the secondary service state comprises at least one of out of service due to testing or out of service due to tuning.

27. The computer-readable medium of claim 2 wherein the provisioning module comprises logic for turning turn up.

28. The computer-readable medium of claim 27 having further processor-executable instructions for initiating or ceasing a pseudo random binary sequence.

29. The computer-readable medium of claim 2 wherein the autotuning module is configured to communicate with components comprising at least one of a variable optical attenuator in a multiplexer-demultiplexer card, a variable optical attenuator, a management card, an optical spectrum analyzer, an optical amplifier, or a dynamic gain equalizer.

30. The computer-readable medium of claim 2 wherein the autotuning module comprises logic to execute tuning scenarios based on at least one topological condition.

31. The computer-readable medium of claim 30 wherein the autotuning module further comprises logic to accomplish tasks comprising at least one of bringing up a wavelength or optical channel path between two end points or bringing up an optical device into and out of service.

32. The computer-readable medium of claim 31 wherein the optical device includes an optical amplifier.

33. The computer-readable medium of claim 2 wherein the autotuning module is configured to notify at least one subsystem of system specific event activities and information comprising at least one of tuning started, tuning finished, tuning success, failures, canceling, wavelength turnup completed, wavelength turndown completed, or unable to converge span loss over user configurable thresholds.

34. The computer-readable medium of claim 33 wherein failures are reported to the management card, the failures comprising at least one of excessive span loss, loss of expected spectrum wavelength, excessive power tilt, inability to bring spectrum into an appropriate band, hardware or software failures of a tuning station, or tuning communications failure.

35. The computer-readable medium of claim 1 wherein the autotuning process is commenced via a control sequence.

36. The computer-readable medium of claim 1 wherein the autotuning is initiated via at least one triggering event.

37. The computer-readable medium of claim 36 wherein the at least one triggering event comprises at least one of system turn on, change of state or topology, user command, an idle period expiration, insertion or activation of an optics card module, optical hardware change, or changes of optical topology.

38. The computer-readable medium of claim 37 wherein the optics card module includes an optical amplifier or an optical spectrum analyzer.

39. The computer-readable medium of claim 37 wherein the optical hardware change comprises at least one of a card reset or a hardware failure.

40. The computer-readable medium of claim 37 wherein the changes of optical topology comprise at least one of adding a wavelength or turning up a wavelength.

41. The computer-readable medium of claim 37 wherein the changes of optical topology comprise at least one of dropping a wavelength or turning down a wavelength.

42. A method for automatically tuning an optical transport system having a plurality of modules for operating the system at a predetermined efficiency, the method comprising:
maintaining a topology tree based on an identified topology, the topology tree comprising node type information about a plurality of nodes in the optical transport system;
identifying key component information for proper optical transport system function;
determining an order for the plurality of nodes to be autotuned based on the topology tree and the key component information; and
autotuning the optical transport system based on the order by passing a token to at least two of the plurality of nodes corresponding to the order, wherein the autotuning comprises bringing a circuit or an optical device into service.

43. The method of claim 42 wherein the plurality of modules comprise at least one of a topology discovery module, a provisioning module, an autotuning module, or a control sequence module.

44. The method of claim 43 wherein the plurality of modules are located in a management card.

45. The method of claim 43 wherein the plurality of modules are present in at least one optical fiber amplifier station.

46. The processor-readable medium of claim 43 wherein the control sequence module initiates a control sequence for the autotuning process.

47. The method of claim 43 wherein the topology discovery module comprises an autodiscovery module for identifying a fiber wavelength topology view of the optical transport system.

48. The method of claim 47 wherein the key component information includes status and configuration information and is provided by the autodiscovery module.

49. The method of claim 47 wherein the topology discovery module further operates to complete actions comprising at least one of controlling a discovery process, controlling builds, propagating a database, or maintaining the database.

50. The method of claim 49 wherein the database comprises a topology tree database stored in a memory of a management card.

51. The method of claim 50 wherein the topology tree database comprises information for autotuning by the provisioning module.

52. The method of claim 51 wherein the information for autotuning comprises at least one of node type or components on the node.

53. The method of claim 52 wherein the information for autotuning further comprises information not related to autotuning.

54. The method of claim 53 wherein the information not related to autotuning includes node name and software versions being used in various components of the node.

55. The method of claim 51 wherein the provisioning module is configured to examine the topology tree database information created by the topology discovery module.

56. The method of claim 55 wherein the provisioning module is further configured to conduct functions comprising at least one of validating channels, validating optical paths, testing components for working condition, or initiating the autotuning module.

57. The method of claim 49 wherein propagating the database is conducted based on open shortest path first propagating methods having logic to detect specific station changes.

58. The method of claim 49 wherein the topology discovery module propagates information relating to changes throughout a network.

59. The method of claim 43 wherein the provisioning module comprises logic to support provisioning of at least one of a logical circuit or an optical channel for autotuning.

60. The method of claim 59 wherein the logic supports provisioning from an endpoint.

61. The method of claim 43 wherein the provisioning module includes logic to turn up a circuit.

62. The method of claim 61 wherein turning up the circuit comprises bringing the circuit into service.

63. The method of claim 43 wherein the provisioning module includes logic for turning down a circuit.

64. The method of claim 63 wherein turning down the circuit comprises removing the circuit from service.

65. The method of claim 63 wherein the logic is configured to determine a primary service state and a secondary service state.

66. The method of claim 65 wherein the primary service state comprises at least one of in service or out of service.

67. The method of claim 66 wherein the secondary service state comprises at least one of out of service due to testing or out of service due to tuning.

68. The method of claim 43 wherein the provisioning module comprises logic for turning turn up.

69. The method of claim 68 further comprising initiating or ceasing a pseudo random binary sequence.

70. The method of claim 43 wherein the autotuning module is configured to communicate with components comprising at least one of a variable optical attenuator in a multiplexer-demultiplexer card, a variable optical attenuator, a management card, an optical spectrum analyzer, an optical amplifier, or a dynamic gain equalizer.

71. The method of claim 43 wherein the autotuning module comprises logic to execute tuning scenarios based on at least one topological condition.

72. The method of claim 71 wherein the autotuning module further comprises logic to accomplish tasks comprising at least one of bringing up a wavelength or optical channel path between two end points or bringing up an optical device into and out of service.

73. The method of claim 72 wherein the optical device includes an optical amplifier.

74. The method of claim 43 wherein the autotuning module is configured to notify at least one subsystem of system specific event activities and information comprising at least one of tuning staffed, tuning finished, tuning success, failures, canceling, wavelength turnup completed, wavelength turndown completed, or unable to converge span loss over user configurable thresholds.

75. The method of claim 74 wherein the failures are reported to the management card, the failures comprising at least one of excessive span loss, loss of expected spectrum wavelength, excessive power tilt, inability to bring spectrum into an appropriate band, hardware or software failures of a tuning station, or tuning communications failure.

76. The method of claim 42 wherein the autotuning process is commenced via a control sequence.

77. The method of claim 42 wherein the autotuning process is initiated via at least one triggering event.

78. The method of claim 77 wherein the at least one triggering event comprises at least one of system turn on, change of state or topology, user command, an idle period expiration, insertion or activation of an optics card module, optical hardware change, or changes of optical topology.

79. The method of claim 78 wherein the optics card module includes an optical amplifier or an optical spectrum analyzer.

80. The method of claim 78 wherein the optical hardware change comprises at least one of a card reset or a hardware failure.

81. The method m of claim 78 wherein the changes of optical topology comprise at least one of adding a wavelength or turning up a wavelength.

82. The method of claim 78 wherein the changes of optical topology comprise at least one of dropping a wavelength or turning down a wavelength.

* * * * *

UNITED STATES PATENT AND TRADEMARK OFFICE
CERTIFICATE OF CORRECTION

| | | |
|---|---|---|
| PATENT NO. | : 7,697,842 B2 | Page 1 of 1 |
| APPLICATION NO. | : 11/514781 | |
| DATED | : April 13, 2010 | |
| INVENTOR(S) | : Young et al. | |

It is certified that error appears in the above-identified patent and that said Letters Patent is hereby corrected as shown below:

Column 9, line 66, delete "photonic block 220," and insert -- microcontroller block 220, --.

Column 10, line 60, delete "fiber strands 122" and insert -- fiber spans 122 --.

Column 13, line 4, delete "fiber amplifier 740" and insert -- erbium doped fiber amplifier 740 --.

Column 13, line 45, delete "management card controller 110," and insert -- management card 110, --.

Column 14, line 55, delete "AZ" and insert -- A-Z --.

Column 17, line 7, delete "dependant" and insert -- dependent --.

Column 18, line 36, delete "$P_{EDFA.out\ req}$" and insert -- $P_{EDFA.out.req}$ --.

Column 18, line 36, delete "$n_{EDFA})$" and insert -- *#$n_{EDFA})$ --.

Column 19, line 8, delete "then" and insert -- than --.

Column 19, line 34, delete "repeated" and insert -- repeated. --.

Column 19, line 42, delete "multiplexer demultiplexer" and insert -- multiplexer-demultiplexer --.

Column 20, line 56, delete "bandwith" and insert -- bandwidth --.

Column 30, line 41, in Claim 46, delete "processor-readable medium" and insert -- method --.

Column 32, line 17, in Claim 74, delete "staffed," and insert -- started, --.

Column 32, line 41, in Claim 81, delete "method m" and insert -- method --.

Signed and Sealed this
Third Day of May, 2011

David J. Kappos
*Director of the United States Patent and Trademark Office*